United States Patent
Prater et al.

(10) Patent No.: US 12,416,566 B2
(45) Date of Patent: Sep. 16, 2025

(54) AUTOMATED SPECTROSCOPIC ANALYSIS OF MICRON-SCALE MICROPLASTIC PARTICLES WITH OPTICAL PHOTOTHERMAL INFRARED SPECTROSCOPY

(71) Applicant: Photothermal Spectroscopy Corp., Santa Barbara, CA (US)

(72) Inventors: Craig Prater, Santa Barbara, CA (US); Kevin Kjoller, Santa Barbara, CA (US); Eoghan Dillon, Santa Barbara, CA (US); Andrew Stuart, Santa Barbara, CA (US)

(73) Assignee: Photothermal Spectroscopy Corp., Santa Barbara, CA (US)

( * ) Notice: Subject to any disclaimer, the term of this patent is extended or adjusted under 35 U.S.C. 154(b) by 253 days.

(21) Appl. No.: 18/350,690

(22) Filed: Jul. 11, 2023

(65) Prior Publication Data
US 2025/0020569 A1    Jan. 16, 2025

(51) Int. Cl.
G01N 15/14    (2024.01)
G01N 15/1434  (2024.01)

(52) U.S. Cl.
CPC ................ *G01N 15/1434* (2013.01)

(58) Field of Classification Search
CPC ................................ G01N 15/1434
See application file for complete search history.

(56) References Cited

U.S. PATENT DOCUMENTS

| | | |
|---|---|---|
| 9,091,594 B2 | 7/2015 | Furstenberg |
| 9,841,324 B2 | 12/2017 | Furstenberg |
| 2021/0164894 A1 | 6/2021 | Prater et al. |
| 2021/0215601 A1 | 7/2021 | Prater et al. |
| 2022/0381684 A1 | 12/2022 | Cheng |
| 2023/0063843 A1 | 3/2023 | Prater |

FOREIGN PATENT DOCUMENTS

WO    2024073557 A1    4/2024

OTHER PUBLICATIONS

International Search Report and Written Opinion for PCT/US2024/037610 date mailed Oct. 24, 2024.
Dong. "Automated analysis of microplastics based on vibrational spectroscopy: Are we measuring the same metrics?" 1-10. Anal Bioanal Chem. Feb. 15, 2022; <pp. 2, 3, 7, and 9 figure 2, figure 5>; <DOI: 10.1007/s00216-022-03951-6>.
Koziol. "Super-Resolved 3D Mapping of Molecular Orientation Using Vibrational Techniques" 14278-14287. J. Am Chem. Soc. Jul. 26, 2022; <p. 14283, 14284>; <DOI:10.1021/jacs.2c05306>.

(Continued)

*Primary Examiner* — Mark R Gaworecki
(74) *Attorney, Agent, or Firm* — MERCHANT & GOULD P.C.

(57) ABSTRACT

Detection of microplastics is accomplished using a combination of techniques. A position-detection technique such as crossed-polarization detection, autofluorescence detection, or photothermal infrared imaging is used to determine the locations of microplastics in a sample. Infrared absorption can be detected at those locations to characterize the microplastics. In this way the microplastic content can be located and characterized more quickly and accurately than using conventional techniques.

30 Claims, 11 Drawing Sheets

(56) References Cited

OTHER PUBLICATIONS

Sandt. "Super-Resolution Infrared Microspectroscopy Reveals Heterogeneous Distribution of Photosensitive Lipids in Human Hair Medulla" 1-42. Talanta. Mar. 1, 2023; <abstract; p. 16, table 1>; <DOI: 10.1016/j.talanta.2022.124152>.

R. Furstenberg, C. A. Kendziora, M. R. Papantonakis, V. Nguyen and R. A. McGill, "Chemical Imaging using Infrared Photo-thermal Microspectroscopy" Proc. of SPIE vol. 8374, 837411 (2012).

C. Li, D. Zhang, M. N. Slipchenko, and J.-X. Cheng, "Mid-Infrared Photothermal Imaging of Active Pharmaceutical Ingredients at Submicrometer Spatial Resolution", Anal. Chem., 89, 9, 4863-4867 (2017).

D. Zhang, C. Li, C. Zhang, M. N. Slipchenko, G. Eakins, and J.-X. Cheng, "Depth-resolved mid-infrared photothermal imaging of living cells and Organisms with Submicrometer Spatial Resolution", Science Advances, 2, 9, e1600521 (2016).

Z. Li, K. Aleshire, M. Kuno, and G. V. Hartland, "Super-Resolution Far-Field Infrared Imaging by Photothermal Heterodyne Imaging", The Journal of Physical Chemistry B, 121,37, 8838-8846 (2017).

Z. Li, M. Kuno, and G. Hartland, "Super-resolution imaging with mid-IR photothermal microscopy on the single particle level", in SPIE Nanoscience+ Engineering (International Society for Optics and Photonics, 2015), p. 954912-954912-954918.

Z. Li, M. Kuno, and G. Hartland, "Super-resolution Mid-infrared Imaging using Photothermal Microscopy", in Conference on Lasers and Electro-Optics (Optical Society of America, San Jose, California, 2016), p. ATu3J.7.

A. Mërtiri, A. Totachawattana, H. Liu, M. K. Hong, T. Gardner, M. Y. Sander, and S. Erramilli, "Label free mid-IR photothermal imaging of bird brain with quantum cascade laser", in CLEO: Applications and Technology (Optical Society of America, 2014), p. AF1B. 4.

Yin et al., "Video-rate mid-infrared photothermal imaging by single-pulse photothermal detection per pixel" in Science Advances, Jun. 14, 2023 vol. 9, Issue 24 DOI: 10.1126/sciadv.adg8814.

Andrady, A.L., "The plastic in microplastics: A review". Marine pollution bulletin, 2017. 119(1) p. 12-22; Hale, R.C., et al., A Global Perspective on Microplastics. Journal of Geophysical Research: Oceans, 2020. 125(1): p. e2018JC014719.

Ivleva, N.P., "Chemical analysis of microplastics and nanoplastics: challenges, advanced methods, and perspectives", Chemical Reviews, 2021. 121(19): p. 11886-11936.

Dąbrowska, A., "Raman Spectroscopy of Marine Microplastics—A short comprehensivecompendium for the environmental scientists", Marine Environmental Research, 2021. 168: p. 105313.

Yong, C.Q.Y., S. Valiyaveettil, and B.L. Tang, "Toxicity of microplastics and nanoplastics in mammalian systems", International Journal of Environmental Research and Public Health, 2020. 17(05): p. 1509).

Vethaak, A.D. and J. Legler, "Microplastics and human health", Science, 2021. 371(6530): p. 672-674).

De Frond, H., et al. "Monitoring microplastics in drinking water: An interlaboratory study to inform effective methods for quantifying and characterizing microplastics", Chemosphere, 2022. 298: p. 134282).

Xu, J.-L., et al., "FTIR and Raman imaging for microplastics analysis: State of the art, challenges and prospects", TrAC Trends in Analytical Chemistry, 2019. 119: p. 115629.

Sierra et al., "Identification of microplastics in wastewater samples by means of polarized Light optical microscopy," Environmental Science and Pollution Research (2020) 27:7409-7419, https://doi.org/10.1007/s11356-019-07011-y.

Wong, C.S. and S. Coffin, "Standard Operating Procedures for Extraction and Measurement by Raman Spectroscopy of Microplastic Particles in Drinking Water", 2021, Southern California Coastal Water Research Project Authority and Calfiornia State Water Resources Control Board, 32 pages.

Wong, C.S.C., Scott, "Standard Operating Procedures for Extraction and Measurement by Infrared Spectroscopy of Microplastic Particles in Drinking Water", 2021, Southern California Coastal Water Research Project Authority and California State Water Resources Control Board, 30 pages.

Primpke, S., M. Godejohann, and G. Gerdts, "Rapid identification and quantification of microplastics in the environment by quantum cascade laser-based hyperspectral infrared chemical imaging", Environmental Science & Technology, 2020. 54(24): p. 15893-15903.

Cabernard, L., et al., "Comparison of Raman and Fourier transform infrared spectroscopy for the quantification of microplastics in the aquatic environment", Environmental science & technology, 2018. 52(22): p. 13279-13288.

Böke, J.S., J. Popp, and C. Krafft, "Optical photothermal infrared spectroscopy with simultaneously acquired Raman spectroscopy for two-dimensional microplastic identification", Scientific reports, 2022. 12(1): p. 1-13.

Shi, Y., et al., "Visual characterization of microplastics in corn flour by near field molecular spectral imaging and data mining", Science of The Total Environment, available Dec. 7, 2022 862: p. 160714.

Barrett, J., et al., "Microplastic Pollution in Deep-Sea Sediments From the Great Australian Bight", Frontiers in Marine Science, 2020. 7(808).

Chen, C.K., et al., "A portable purification system for the rapid removal of microplastics from environmental samples", Chemical Engineering Journal, 2022. 428: p. 132614.

Krafft, C., "Optical photothermal infraredspectroscopic applications in microplastics—comparison with Fourier transform infrared and Raman spectroscopy", in Molecular and Laser Spectroscopy. 2022, Elsevier. p. 305-336.

Yan, F.,et al., Development of a binary digestion system for extraction microplastics in fish and detection method by Optical Photothermal Infrared (O-PTIR). Frontiers in Marine Science, 2022: p. 99.

Anderson, J., et al. "Submicron Simultaneous IR and Raman Spectroscopy (IR+ Raman): Breakthrough Developments in Optical Photothermal IR (O-PTIR) Combined for Enhanced Failure Analysis", in ISTFA 2019. 2019. ASM International.

Su, Y., et al., "Steam disinfection releases micro (nano) plastics from silicone-rubber baby teats as examined by optical photothermal infrared microspectroscopy", Nature Nanotechnology, 2022. 17(1): p. 76-85.

Huang, W., et al., "Comparison of Lead Adsorption on the Aged Conventional Microplastics, Biodegradable Microplastics and Environmentally-Relevant Tire Wear Particles: Effects of Aquatic Chemistry and Desorption Behavior", posted on Sep. 30, 2022 Biodegradable Microplastics and Environmentally-Relevant Tire Wear Particles: Effects of Aquatic Chemistry and Desorption Behavior.

Kang et al., "Modification of a Nile Red Staining Method for Microplastics Analysis A Nile Red Plate Method", Water 2020, 12, 3251; doi:10.3390/w12113251.

FIG. 1B

| Particle # | Size (μm) | Area (μm²) | X (μm) | Y (μm) | Highest HQI | Chemical ID |
|---|---|---|---|---|---|---|
| 1 | 10.142 | 3.594 | 42.800 | -1948.250 | 0.650 | cellulose |
| 2 | 195.968 | 15.796 | 177.050 | -1947.400 | 0.809 | PMMA |
| 3 | 172.797 | 14.833 | 69.400 | -1945.400 | 0.626 | PMMA |
| 4 | 23.205 | 5.436 | 144.450 | -1935.650 | 0.781 | PA (Nylon) |
| 5 | 10.068 | 3.580 | 18.700 | -1935.250 | 0.866 | PMMA |
| 6 | 87.031 | 10.527 | 9.200 | -1937.050 | 0.824 | protein |

161

PMMA

PS

AUTOMATED SPECTROSCOPIC ANALYSIS OF MICRON-SCALE MICROPLASTIC PARTICLES WITH OPTICAL PHOTOTHERMAL INFRARED SPECTROSCOPY

TECHNICAL FIELD

This disclosure relates to investigating or analyzing materials by the use of optical means, i.e. using infra-red, visible or ultra-violet light. In particular, this disclosure is related to infrared spectroscopy and imaging with spatial resolution down to the sub-micron scale using an optical photothermal detection technique as used to identify chemical composition of a population of micron scale microplastic particles.

BACKGROUND

Optical photothermal techniques have been described in U.S. Pat. Nos. 9,091,594 and 9,841,324, for example. These references often refer to the technique by different names and acronyms. For the purposes of this application, these techniques collectively will be referred to as Optical Photothermal Infrared (OPTIR).

Several research groups have worked in this general field of OPTIR, including researchers at Naval Research Laboratory, Purdue University, Notre Dame University, Boston University, and the Massachusetts Institute of Technology. Instruments developed in these labs use visible light beams to probe the photothermal response of samples in response to absorption of infrared radiation. Potentially relevant background publications and patents include: (1) R. Furstenberg, C. A. Kendziora, M. R. Papantonakis, V. Nguyen and R. A. McGill, "Chemical Imaging using Infrared Photo-thermal Microspectroscopy" Proc. of SPIE Vol. 8374, 837411 (2012); (2) R. Furstenberg, C. Kendziora, N. D. Bassim, R. A. McGill, and V. K. Nguyen, U.S. Pat. No. 9,091,594 B2 (2015); (3) C. Li, D. Zhang, M. N. Slipchenko, and J.-X. Cheng, Anal. Chem., 89, 9, 4863-4867 (2017); (4) D. Zhang, C. Li, C. Zhang, M. N. Slipchenko, G. Eakins, and J.-X. Cheng, Science Advances, 2, 9, e1600521 (2016). (5) Z. Li, K. Aleshire, M. Kuno, and G. V. Hartland, The Journal of Physical Chemistry B, 121, 37, 8838-8846 (2017); (6) Z. Li, M. Kuno, and G. Hartland, "Super-resolution imaging with mid-IR photothermal microscopy on the single particle level", in SPIE Nanoscience+Engineering (International Society for Optics and Photonics, 2015), p. 954912-954912-954918; (7) Z. Li, M. Kuno, and G. Hartland, "Super-resolution Mid-infrared Imaging using Photothermal Microscopy", in Conference on Lasers and Electro-Optics (Optical Society of America, San Jose, California, 2016), p. ATu3J.7.; (8) A. Mërtiri, A. Totachawattana, H. Liu, M. K. Hong, T. Gardner, M. Y. Sander, and S. Erramilli, "Label free mid-IR photothermal imaging of bird brain with quantum cascade laser", in CLEO: Applications and Technology (Optical Society of America, 2014), p. AF1B. 4; (9) M. Y. Sander, "Mid-infrared photothermal imaging", in Laser Science (Optical Society of America, 2015), p. LM1I. 2.

The OPTIR technique works by measuring small changes in the probe beam after interacting with IR absorbing regions of the sample. IR absorbing regions of the sample convert absorbed IR radiation into heat, causing a local temperature rise in the sample. This temperature rise can change the shape, size, surface position, and/or index of refraction of the IR absorbing regions of the sample. One or more of these changes can change the intensity, angle, and or optical phase of probe light after interacting with the sample. Light that is reflected from, scattered from and/or transmitted through the sample can be collected and analyzed. Detecting and measuring changes in the collected probe light in response to IR illumination of the sample can be indicative of TR absorption by regions of the sample illuminated by the probe light. Detecting changes in collected probe light as a function of IR wavelength/wavenumber produces signals that are indicative of TR absorption spectra of the sample material under test. Measuring changes in collected probe light as a function of sample position can be used to create a map indicative of IR absorption by the sample and in turn, a map of the distribution of different chemical species in a sample.

Microplastics

Microplastics (MP), plastic waste particles having a diameter of less than about 5 mm, such as in the size range from 1 μm to 5 mm, have been recognized as a global problem. (See for example Andrady, A. L., The plastic in microplastics: A review. Marine pollution bulletin, 2017. 119(1): p. 12-22; Hale, R. C., et al., A Global Perspective on Microplastics. Journal of Geophysical Research: Oceans, 2020. 125(1): p. e2018JCP14719; and Ivleva, N. P., Chemical analysis of microplastics and nanoplastics: challenges, advanced methods, and perspectives. Chemical Reviews, 2021. 121(19): p. 11886-11936.) Plastic production has increased by more than 10× since the 1970s, resulting in 335 million metric tons of plastic waste being generated in 2017 with plastic waste entering the environment expected to triple over the next twenty years. Resulting primarily from the breakdown of plastic waste, microplastics are now ubiquitous in the environment, and have been found extensively in water, air, and soil. Microplastics are regularly ingested by marine life, hence microplastics are now pervasive in the food web and are now routinely found in seafood. A recent review by Dgbrowska noted "Marine microplastics are considered one of the most critical problems to be investigated and resolved in years to come." (Dgbrowska, A., Raman Spectroscopy of Marine Microplastics—A short comprehensive compendium for the environmental scientists. Marine Environmental Research, 2021. 168: p. 105313.) Microplastics can enter the human body by drinking contaminated water, by ingestion of contaminated food, and/or by respiration of airborne particles. Microplastics may have potentially profound impacts on human health, especially micron scale particles that are able to pass through the gut wall to accumulate in tissue and impact organ function and other damage. A recent review detailed both human cell culture testing and in vivo tests on mouse models that revealed adverse biological effects, including particle toxicity, oxidative stress, cytokine secretion, cellular damage, inflammatory and immune reactions, DNA damage, neurotoxic and metabolic effects (Yong, C. Q. Y., S. Valiyaveettil, and B. L. Tang, Toxicity of microplastics and nanoplastics in mammalian systems. International Journal of Environmental Research and Public Health, 2020. 17(05): p. 1509).

To understand the impacts on human health and offer insights for possible remediation, there is a recognized need within the microplastics research community to characterize distributions of microplastic particles in the environment, biological tissue, and food. As reported in a recent perspective in Science "Adequate analytical tools to sample, isolate, detect, quantify, and characterize small microplastics (<10 μm) . . . are urgently needed" (Vethaak, A. D. and J. Legler, Microplastics and human health. Science, 2021. 371(6530): p. 672-674). There is also a clear recognition that existing techniques for particle analysis are insufficient for small particles, i.e. <10 µm, with existing techniques failing in one or more key metrics including minimum particle size, accuracy of chemical identification, ability to analyze colored/dyed microplastics, as well as measurement/analysis speed and automation.

Raman spectroscopy, for example, routinely fails when the samples have high levels of autofluorescence that swamps the Raman signal. Raman also can struggle with dark and/or colored samples that can lead to photodamage from the Raman excitation laser. In a recent multi-laboratory study Raman achieved only 5% accuracy on certain colored plastics, only 5% of dyed cellulose, and only 18% of natural particles, many of which were misidentified as plastics. Further, in the same study, Raman users only successfully identified a total of 24 microplastic particles in the 1-20 µm size range versus >1700 successful particle IDs for larger size fractions (from: De Frond, H., et al., Monitoring microplastics in drinking water: An interlaboratory study to inform effective methods for quantifying and characterizing microplastics. Chemosphere, 2022. 298: p. 134282).

Raman suffers from three key limitations when applied to MP analysis: (1) Raman is extremely inefficient, only ~1 in $10^6$ photons incident on a sample are Raman scattered which in turn leads to high power requirements and/or excessive integration times; (2) many plastics, especially dyed plastics, have large fluorescent backgrounds that can overwhelm the Raman signal; (3) colored/dark particles often suffer destructive photodamage under typical Raman laser illumination. The combination of these factors can lead to significant difficulties in chemical identification as evidenced by the De Frond publication mentioned above.

Conventional infrared spectroscopy, including laser direct infrared (LDIR) approaches also routinely fails with smaller microplastic particles due to fundamental resolution limits, sensitivity limits, and size and shape dependent scattering artifacts. As a result, recent protocols published by the Southern California Coastal Water Research Project (SCCWRP) recommend the use of traditional IR and Raman spectroscopic analysis only for microplastic particles greater than 20 µm in size. See for example the following references: (1) Xu, J.-L., et al., FT-IR and Raman imaging for microplastics analysis: State of the art, challenges and prospects. TrAC Trends in Analytical Chemistry, 2019. 119: p. 115629; (2) De Frond, H., et al., Monitoring microplastics in drinking water: An interlaboratory study to inform effective methods for quantifying and characterizing microplastics. Chemosphere, 2022. 298: p. 134282; (3) Wong, C. S. and S. Coffin, Standard Operating Procedures for Extraction and Measurement by Raman Spectroscopy of Microplastic Particles in Drinking Water. 2021, Southern California Coastal Water Research Project Authority and Calfiornia State Water Resources Control Board; (4) Wong, C. S. C., Scott, Standard Operating Procedures for Extraction and Measurement by Infrared Spectroscopy of Microplastic Particles in Drinking Water. 2021, Southern California Coastal Water Research Project Authority and California State Water Resources Control Board; (5) Primpke, S., M. Godejohann, and G. Gerdts, Rapid identification and quantification of microplastics in the environment by quantum cascade laser-based hyperspectral infrared chemical imaging. Environmental Science & Technology, 2020. 54(24): p. 15893-15903; (6) Cabernard, L., et al., Comparison of Raman and Fourier transform infrared spectroscopy for the quantification of microplastics in the aquatic environment. Environmental science & technology, 2018. 52(22): p. 13279-13288.

OPTIR has been used to manually measure small populations of microplastic particles, as described for example in the following references, hereby incorporated by reference: (1) Böke, J. S., J. Popp, and C. Krafft, Optical photothermal infrared spectroscopy with simultaneously acquired Raman spectroscopy for two-dimensional microplastic identification. Scientific reports, 2022. 12(1): p. 1-13. (2) Shi, Y., et al., Visual characterization of microplastics in corn flour by near field molecular spectral imaging and data mining. Science of The Total Environment, 2023. 862: p. 160714. (3) Barrett, J., et al., Microplastic Pollution in Deep-Sea Sediments From the Great Australian Bight. Frontiers in Marine Science, 2020. 7(808). (4) Chen, C. K., et al., A portable purification system for the rapid removal of microplastics from environmental samples. Chemical Engineering Journal, 2022. 428: p. 132614. (5) Krafft, C., Optical photothermal infrared spectroscopic applications in microplastics—comparison with Fourier transform infrared and Raman spectroscopy, in Molecular and Laser Spectroscopy. 2022, Elsevier. p. 305-336. (6) Yan, F., et al., Development of a binary digestion system for extraction microplastics in fish and detection method by Optical Photothermal Infrared (O-PTIR). Frontiers in Marine Science, 2022: p. 99. (7) Anderson, J., et al. Submicron Simultaneous IR and Raman Spectroscopy (IR+ Raman): Breakthrough Developments in Optical Photothermal IR (O-PTIR) Combined for Enhanced Failure Analysis. in ISTFA 2019. 2019. ASM International. (8) Su, Y., et al., Steam disinfection releases micro (nano) plastics from silicone-rubber baby teats as examined by optical photothermal infrared microspectroscopy. Nature Nanotechnology, 2022. 17(1): p. 76-85. (9) Huang, W., et al., Comparison of Lead Adsorption on the Aged Conventional Microplastics, Biodegradable Microplastics and Environmentally-Relevant Tire Wear Particles: Effects of Aquatic Chemistry and Desorption Behavior. Biodegradable Microplastics and Environmentally-Relevant Tire Wear Particles: Effects of Aquatic Chemistry and Desorption Behavior.

None of the references listed above, however, describe fully automated OPTIR analysis involving automated particle identification, automated OPTIR spectroscopic analysis and automated chemical identification of microplastic particles. As a result, there has been an unmet need to high reliability spectroscopic identification of sub 20 µm microplastic particles. This document outlines methods and apparatus to address this previously unmet need.

SUMMARY

According to embodiments described herein, microscopic analysis of a sample uses optical imaging, image particle analysis, and automated spectroscopic analysis to identify the chemical composition of micron-scale microplastic particles at high speed over a wide variety of chemical compositions and high chemical identification success rates.

According to a first embodiment, a method for automatically characterizing a sample with a population of microplastic particles with photothermal infrared spectroscopy is disclosed. The method includes acquiring a polarization optical image of the sample, analyzing the polarization optical image to automatically identify a plurality of microplastic particle positions of the sample, based upon the plurality of microplastic particle positions, automatically positioning a microplastic particle under a probe beam of a photothermal infrared spectroscopy system, and illuminating the microplastic particle with a plurality of infrared wavelengths. The method further includes collecting at a detector probe beam light that is at least one of reflected, scattered, or transmitted from the microplastic particle, and measuring a change in the collected probe light from the microplastic particle corresponding to infrared absorption of the microplastic particle.

According to another embodiment, an optical system is disclosed. The optical system can be used for automatically characterizing a sample with a population of microplastic particles. The system includes a crossed polarized microscopy subsystem arranged to acquire a polarization optical image of a sample and identify a plurality of microplastic particle positions of the sample. The system further includes a photothermal infrared spectroscopy system arranged to illuminate the plurality of microplastic particle positions with a plurality of infrared wavelengths to detect a corresponding optical photothermal infrared absorption of the microplastic particles at each of the plurality of microplastic particle positions.

According to another embodiment, a method for automatically characterizing a sample with a population of microplastic particles with photothermal infrared spectroscopy is disclosed. The method includes acquiring at least one photothermal infrared images of the sample at a plurality of infrared wavelengths; analyzing at least one optical image and/or photothermal infrared image to identify a plurality of particle positions; analyzing the at least one photothermal infrared images of the sample to select a portion of the plurality of particle positions as likely microplastic particle positions; based upon the plurality of likely microplastic particle positions, automatically positioning a particle under a probe beam of a photothermal infrared spectroscopy system; illuminating the particle with a plurality of infrared wavelengths; and detecting a change in probe light collected from the particle corresponding to infrared absorption of the particle.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIGS. 1A and 1B show a simplified schematic diagram of a method for automated detection and analysis of microplastic particles and automated analysis of their chemical composition by OPTIR.

Figure 1A:
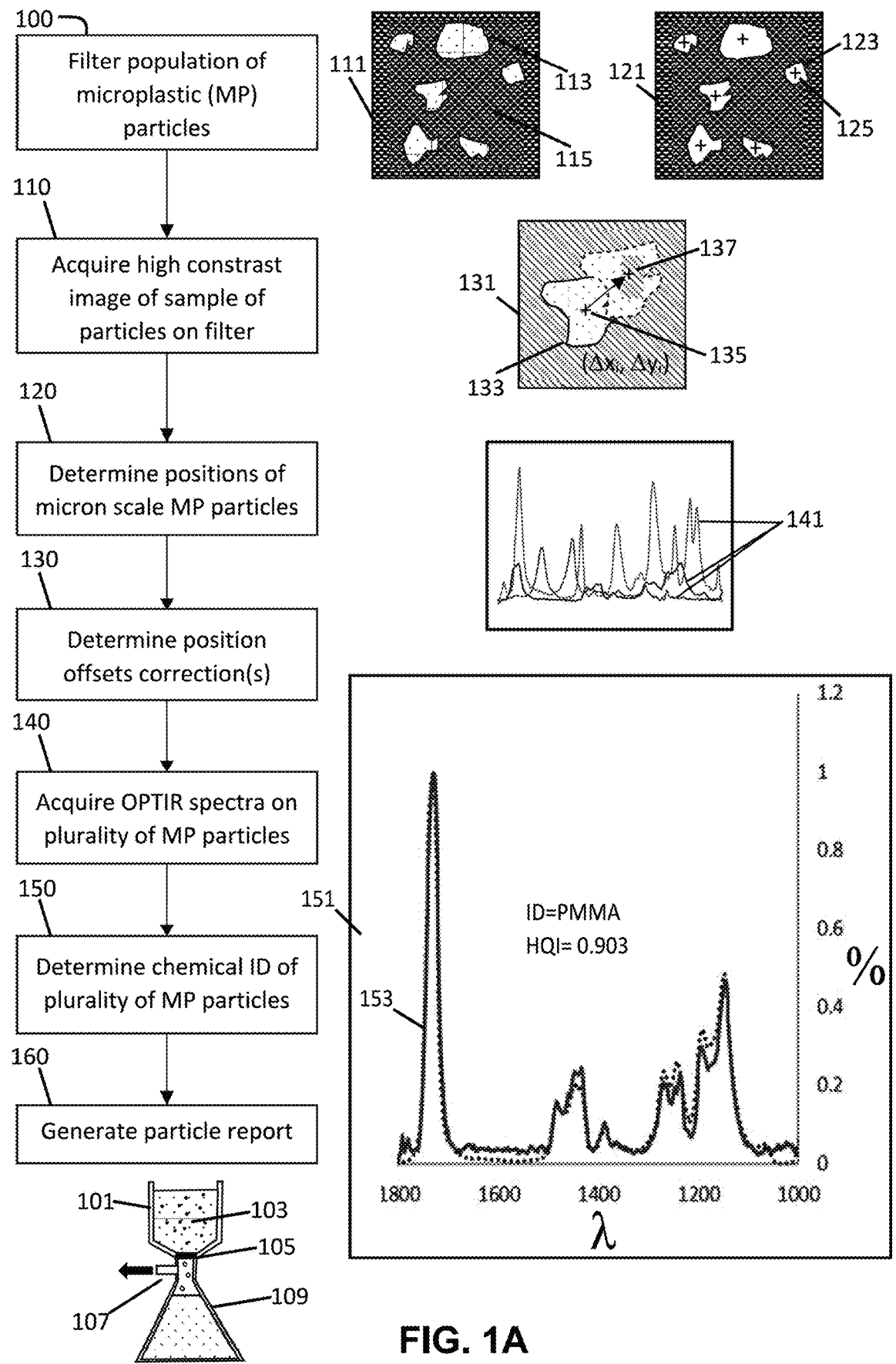

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

This specification described methods and apparatuses for performing optical photothermal infrared (OPTIR) imaging and spectroscopy with improved sensitivity, improved signal-to-noise ratio, and decreased background signal.

For purposes of this specification, the following terms are specifically defined as follows:

An "analyzer/controller" refers to a system to facilitate data acquisition and control of the OPTIR system. The controller may be a single integrated electronic enclosure or may comprise multiple distributed elements. The control elements may provide control for positioning and/or scanning of the probe tip and/or sample. They may also collect data about the probe deflection, motion or other response, provide control over the radiation source power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, or other circuit elements. A memory configured to store computer programs may be implemented along with discrete circuit components to carry out one or more of the processes described herein.

"Beam combiner" means an optical element that can combine two beams onto the same optical path. In one configuration, a beam combiner may be a beam splitter used in a reverse direction, i.e. combining one beam that reflects off of the beam splitter interface with another beam that is transmitted through the beam splitter interface. A beam splitter cube, for example, can be used as both a beam splitter and a beam combiner. Optical elements that are marketed as beam splitters can be used as a beam combiner, even if they are not used to split light onto two paths. For example, a Mach-Zehnder interferometer uses one beam splitter to split incident light onto two paths and a second beam splitter to recombine the two beams. In this case, the second beam splitter is being used as a beam combiner. In a Michelson interferometer, a single beam splitter is used to both divide the incident light and then recombine it. Thus, the beam splitter in a Michelson interferometer as being used as both a beam splitter and a beam combiner. A beam combiner can also be an optical fiber based device, for example combining the light from two input fibers into one output fiber, for example a 1×2 fiber coupler. A single 1×2 fiber coupler can be used as both a beam splitter and a beam combiner.

"Beam splitter" refers to an optical element that can divide light onto at least two paths. A beam splitter can comprise a plate, a cube and/or a prism or other shapes/configurations that can divide a beam of light. The beam splitter can comprise a thin film that is partially reflecting at the wavelength of interest such that a portion of an incident beam is reflected and another portion is transmitted. A beam splitter may be polarizing, wherein in substantially transmits light of one polarization and reflects light of an orthogonal polarization. A beam splitter may also divide light along two transmission paths based on polarization, for example in the case that the beam splitter is a Nomarski or Wollaston prism. A beam splitter may also be non-polarizing, where light is divided between two paths without substantial dependence on the polarization of the incident light. A beam splitter can also be an optical fiber based device, for example splitting light from one input optical fiber into at least two output optical fibers, for example a 1×2 fiber coupler. A beam splitter may be a 50:50 beam splitter in which substantially equal fractions of light are directed on two different paths. They can also be unbalanced, for example a 90:10 or 70:30 or similar beam splitter that direction 90% of light on one path and 10% on another, or 70% on one path and 30% on another.

A "camera" refers to an array-based photodetector comprising a plurality of photosensitive pixels. A camera may comprise one or more technology including but not limited to CCD, EM-CCD, CMOS, s-CMOS, and/or other photosensitive array technologies. The camera may support frame rates from a few frames per seconds, hundreds of frames per second, or even thousands of frames per second or higher.

The phrases "collecting probe light" and "collecting probe radiation" refer to collecting radiation of a probe light beam that has interacted with a sample. The probe light can be collected after reflection, scattering, transmission, evanescent wave coupling, and/or transmission through an aperture probe.

"Confocal microscopy" refers to a form of optical microscopy in which the light collected at a detector is confined to light that passes through a small volume within the 3D focus volume of an optical objective on a sample. Confocal microscopy is often performed by placing a "confocal aperture" at a focal plane that is equivalent with the focal plane of the sample, thus blocking stray light that does not pass through the focus volume on the sample.

A "detector" refers to a device that produces a signal indicative of the power, intensity and/or energy of light/radiation incident on the detector surface. The signal will generally be an electrical signal, for example a voltage, current and/or an electrical charge. The detector may be a photodiode, a photo-transistor, a charge coupled device (CCD). In some cases, a detector may be a semiconducting detector, for example a silicon PIN photodiode. A detector may also be an avalanche photodiode, a photomultiplier tube, or any other device that produce a change in current, voltage, charge, conductivity or similar upon incidence of light. A detector may comprise a single element, multiple detector elements, for example a bi-cell or quad-cell, a linear or two dimensional array of detector elements, including camera based detectors.

"Diffraction limit" of a light beam means the minimum separation of two optical sources that can be distinguished by a detector. The Abbe diffraction limit d for a microscope having a numerical aperture (NA) and operating at a wavelength $\lambda$ is defined as $d=\lambda/(2 \cdot NA)$. Physical restraints on the numerical aperture of a microscope prohibit very large numerical apertures, and therefore the diffraction limit of a microscope depends strongly upon the operating wavelength used for detection, with large wavelengths corresponding to relatively poor resolution and high wavelengths corresponding to increased precision.

"Demodulate" or "demodulation" refers to extracting an information-bearing signal from an overall signal, usually, but not necessarily at a specific frequency. For example, in this application, the collected probe light collected at a photo detector represents an overall signal. The demodulation process picks out the portion that is being perturbed by infrared light absorbed by the sample. Demodulation can be accomplished by a lock-in amplifier, a fast Fourier transform (FFT), a calculation of a discrete Fourier component at a desired frequency, a resonant amplifier, a narrow band bandpass filter, or any other technique that largely enhances the signal of interest while suppressing background and noise signals that are not in sync with the modulation.

A "demodulator" refers to a device or system that performs demodulation.

A "feedback loop" is a control loop that is intended to maintain a parameter substantially near a target value ("setpoint") through the adjustment of a control element. A "phase feedback loop" is a feedback loop intended to attempt to maintain the optical phase difference of an interferometer at a target phase value. Note that despite the feedback loop, the optical phase difference will generally not remain truly constant or fixed as disturbances in the optical phase difference can occur at speeds that are too fast for the phase feedback loop to compensate. As such there is often an error, especially a transient error between the target phase value and the actual phase.

"Figure of merit" refers to any metric or indicator of the relative quality of a signal or measurement. The figure of merit can for example be a measurement sensitivity, a signal strength, a noise level, a signal to noise ratio, a background level, a signal to background ratio, any combination of these, or other metric that lets one rank the relative quality of a signal and/or measurement.

"Fluorescence" refers to the emission of light from a sample at one wavelength due to excitation at another wavelength due to fluorescent excitation and emission processes.

"Illuminate," "Illuminating," and "Illumination" mean to direct radiation at an object, for example a surface of a sample, the probe tip, and/or the region of probe-sample interaction. Illumination may include radiation in the infrared wavelength range, visible, and other wavelengths from ultraviolet to a millimeter or more. Illumination may include any arbitrary configuration of radiation sources, reflecting elements, focusing elements and any other beam steering or conditioning elements.

"Infrared absorption spectrum" refers to a spectrum that is proportional to the wavelength dependence of the infrared absorption coefficient, absorbance, or similar indication of IR absorption properties of a sample. An example of an infrared absorption spectrum is the absorption measurement produced by a Fourier Transform Infrared (FTIR) spectrometer, i.e. an FTIR absorption spectrum. In general, infrared light will either be absorbed (i.e., a part of the infrared absorption spectrum), transmitted (i.e., a part of the infrared transmission spectrum), or reflected. Reflected or transmitted spectra of a collected probe light can have a different intensity at each wavelength as compared to the intensity at that wavelength in the probe light source. It is noted that IR measurements are often plotted showing the amount of transmitted light as an alternative to showing the amount of light absorbed. For the purposes of this definition, IR transmission spectra and IR absorption spectra are considered equivalent as the two data sets as there is a simple relationship between the two measurements.

"Infrared source" and "source of infrared radiation" refer to one or more optical sources that generates or emits radiation in the infrared wavelength range, generally between 2-25 microns. The radiation source may be one of a large number of sources, including thermal or Globar sources, supercontinuum laser sources, frequency combs, difference frequency generators, sum frequency generators, harmonic generators, optical parametric oscillators (OPOs), optical parametric generators (OPGs), quantum cascade lasers (QCLs), interband cavity lasers (ICLs), synchrotron infrared radiation sources, nanosecond, picosecond, femtosecond and attosecond laser systems, CO2 lasers, microscopic heaters, electrically or chemically generated sparks, and/or any other source that produces emission of infrared radiation. The source emits infrared radiation in a preferred embodiment, but it can also emit in other wavelength ranges, for example from ultraviolet to THz. The source may be narrowband, for example with a spectral width of <10 $cm^{-1}$ or <1 $cm^{-1}$ less, or may be broadband, for example with a spectral width of >10 $cm^{-1}$, >100 $cm^{-1}$ or greater than 500 $cm^{-1}$. Broadband sources can be made narrow band with filters, monochromators and other devices. The infrared source can also be made up of one of discrete emission lines, e.g. tuned to specific absorption bands of target species.

"Interacting" in the context of interacting with a sample means that light illuminating a sample is at least one of scattered, refracted, absorbed, aberrated, diverted, diffracted, transmitted, and reflected by, through and/or from the sample.

"Interference" reference to the interaction of at least two beams of light including the coherent combination of those light beams.

An "interferometer" refers to an optical apparatus that combines light on at least two paths to create interference between at least two beams. In the context of this application, the two paths are sometimes referred to as a "sample arm" where the light interacts with a sample, and a "reference arm" where the light interacts with a reference reflector.

"Asymmetric interferometer" refers to a configuration of an interferometer comprising interference between light on a sample arm and light on a reference arm in which the amount of light on the reference arm is larger than the amount of light on the sample arm. Note that this is different from other uses of this term that may imply a difference in the length of the arms of the interferometer. The asymmetric interferometer described herein may have equal or unequal interferometer arms, but the asymmetric term refers in this case to the difference in optical power between the reference and sample arms.

A "common path interferometer" is an interferometer in which at least the majority of the sample arm and reference arm share a common optical path and only a minority of the optical path is different.

A "quadrature interferometer" refers to an interferometer with at least two optical paths on which interference occurs and at least two detectors to detect interfering radiation on the two optical paths. A quadrature interferometer can be configured to have an optical phase delay of around 90° between the two interfering paths and hence the two detectors. Quadrature interferometers may also have more detectors, for example four detectors.

A "heterodyne interferometer" refers to an optical interferometer in which the optical frequency and/or optical phase is modulated in at least one arm of the interferometer as compared to the other arm. A heterodyne interferometer can include a "phase modulator," an optical element that can modulate the phase and/or frequency of the light passing through it or reflecting off of it. Phase modulators can include acousto-optic modulators, electro-optic modulators, liquid crystal modulators, or other devices that alter the phase/frequency of light in response to an input signal or stimulus.

A "lock-in amplifier" is one example of a "demodulator" (defined above) and is a device, system, and/or an algorithm that demodulates the response of a system at one of more reference frequencies. Lock-in amplifiers may be electronic assemblies that comprise analog electronics, digital electronics, and combinations of the two. They may also be computational algorithms implemented on digital electronic devices like microprocessors, field programmable gate arrays (FPGAs), digital signal processors, and personal computers. A lock-in amplifier can produce signals indicative of various metrics of an oscillatory system, including amplitude, phase, in phase (X) and quadrature (Y) components or any combination of the above. The lock-in amplifier in this context can also produce such measurements at both the reference frequencies, higher harmonics of the reference frequencies, and/or sideband frequencies of the reference frequencies.

A "mass spectrometer" refers to an apparatus for analyzing the molecular mass distribution of an analyte.

"Modulating" or "modulation" when referring to radiation incident on a sample refers to changing the infrared laser intensity at a location periodically. Modulating the light beam intensity can be achieved by means of mechanical chopping of the beam, controlled laser pulsing, and/or deflecting the laser beam, for example by a tilting mirror that is driven electrostatically, electromagnetically, with piezo actuators or other means to tilt or deform the mirror, or high-speed rotating mirror devices. Modulation can also be accomplished with devices that provide time varying transmission like acousto-optic modulators, electro-optic modulators, photo-elastic modulators, pockel cells, and the like. Modulation can also be accomplished with diffraction effects, for example by diffractive MEMS-based modulators, or by high-speed shutters, attenuators, or other mechanisms that change the intensity, angle, and/or phase of the laser intensity incident on the sample.

"Near infrared light" generally refers to a wavelength range of infrared (IR) light corresponding to 0.75-2 μm.

"Optical property" refers to an optical property of a sample, including but not limited to index of refraction, absorption coefficient, reflectivity, absorptivity, real and/or imaginary components of the index refraction, real and/or imaginary components of the sample dielectric function and/or any property that is mathematically derivable from one or more of these optical properties.

"Optical response" refers to the result of interaction of radiation with a sample. The optical response is related to one or more optical properties defined above. The optical response can be an absorption of radiation, a temperature increase, a thermal expansion, a photo-induced force, the reflection and/or scattering of light or other response of a material due to the interaction with illuminating radiation.

A "narrowband light source" a light source with a narrow bandwidth or linewidth, for example a light of linewidth smaller than 8 cm-1, but in general it can be a light source with a linewidth narrow enough that the linewidth does not cover a spectral range of interest of the sample.

"Polarization optical microscopy" refers to one or more techniques that can be used to create of microscopic image indicative of the polarization rotation, optical activity, and/or chirality in a sample. Examples include crossed polarization microscopy, microellipsometry, Stokes polarimetry, polarization modulation microscopy, polarization-sensitive optical tomography, second harmonic generation, and circular dichroism microscopy. "Polarization optical image" refers to an image obtained by one or more polarization optical microscopy techniques.

"Polarizer" refers to an optical device that preferentially polarizes an optical beam in a desired direction, typically by passing light of one polarization and substantially attenuating, blocking, and/or redirecting light of an orthogonal polarization. Examples include wire grid polarizers, dichroic film polarizers, nanoparticle linear film polarizers, liquid crystal polarizers, polarizing beam splitters, Wollaston or other prism polarizers, reflection polarizer employing Brewster's angle reflection, and birefringent crystals. Alternately, polarizers may create circularly polarized light with a preferred rotation, i.e. right circularly polarized or left circularly polarized light.

"Photothermal distortion" refers to a change in the properties of a sample due to absorption of optical energy, for example the absorption of IR radiation. The photothermal distortion may refer to a change in index of refraction, reflectivity, thermal expansion, surface distortion, or other effects that can be detected with a probe beam.

A "probe source," "probe light source," or "probe radiation source" refer to a radiation source that can be used for sensing of an optical property of a sample. A probe light source can be used to sense the response of the sample to the incidence of light from the infrared light source. The radiation source may comprise a gas laser, a laser diode, a superluminescent diode (SLD), a near infrared laser, a UV and/or visible laser beam generated via sum frequency or difference frequency generation, for example. It may also comprise any or other sources of near-infrared, UV, and/or visible light that can be focused to a spot on the scale smaller than 2.5 micrometer, and or even smaller than 1 micrometer, and possibly smaller than 0.5 micrometer. In some embodiments, the probe light source may operate at a wavelength that is outside the tuning or emission range of the infrared light source, but the probe light source can also be a fixed wavelength source at a select wavelength that does in fact overlap with the tuning range of the infrared light source. A "probe light beam" or "sensing light beam" is a beam originally emitted from a probe light source.

"Probe beam" is a beam of light or radiation that is directed onto a sample to detect a photothermal distortion or other optical change resulting from the interaction of IR radiation with the sample, for example to detect the absorption of IR radiation by the sample.

A "retarder" refers to an optical element that induces a relative optical phase delay in an optical path. Examples of retarders are wave plates, for example half wave plates, quarter wave plates and eight wave plates. One or more retarders/wave plates can be used to introduce an optical phase difference between two polarizations of light, for example to introduce a phase difference between two paths of a quadrature interferometer.

"Signal indicative of" refers to a signal that is mathematically related to a property of interest. The signal may be an analog signal, a digital signal, and/or one or more numbers stored in a computer or other digital electronics. The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

A "signal processor" is an analog and/or digital device that is used to process one or more signal, for example performing filtering, level shifting, squaring, summing, root-mean-square summing and/or any other computation or transformation of an analog and/or digital signal. A signal processor may be an analog circuit where all filtering/shifting/computations are performed with discrete analog components, or one of more digital processors, for example a CPU, computer, field programmable gate array, digital signal processor, or any other suitable digital computation means. The signal processor may be a hybrid of both analog and digital components.

"Spectrum" refers to a measurement of one or more properties of a sample as a function of wavelength or equivalently (and more commonly) as a function of wavenumber.

The terms "about" or "approximate" and the like are synonymous and are used to indicate that the value modified by the term has an understood range associated with it, where the range can be 20%, ±15%, ±10%, ±5%, or ±1%.

The term "substantially" is used to indicate that a result (e.g., measurement value) is close to a targeted value, where close can mean, for example, the result is within 80% of the value, within 90% of the value, within 95% of the value, or within 99% of the value.

Automated Spectroscopic Analysis of Micron-Scale Microplastics with OPTIR

FIG. 1 illustrates a simplified flow chart of the process used herein to perform automated spectroscopic analysis of a population of micron scale microplastic particles. The first step 100 involves the filtration or other preparation of a population of microplastic particles on a substrate. In one embodiment, a filter flask apparatus 101 is used to filter a liquid sample 103 with a population of microplastic particles. At the bottom of the filter flask is a one or more filters 105 with pore size(s) arranged to capture particles in the size range of interest. In one embodiment, the filters may comprise two sequential filters, a first filter with a pore size around 20 microns and a second filter with a pore size around 0.8 microns. The first filter captures the larger particles>20 μm in size, and the second captures micron scale particles in the size range of roughly 1-20 μm. The vacuum flask 101 includes a vacuum port 107 to draw liquid through the filter into receiving flask 109. The filtrate liquid in the receiving flask can be further filtered if desired to capture smaller particles that pass through the first filter. After any filtration step, the filter can be removed from the filter flask and the particles on its surface can be analyzed by OPTIR. Example suitable filters include for example gold coated polycarbonate filters and silicon membrane filters. Many filters are comprised of thin plastic membranes that if uncoated would provide an OPTIR spectroscopic signal that could interfere with measurement of the spectrum of a small microplastic particle on the filter surface. Thin metal coatings on the plastic filters can block IR absorption by the filter and avoid this problem. Filters made from silicon, silicon nitride, silicon dioxide, metal films, and/or inorganic materials can also be used and in some cases without need for additional coating.

At 110, an optical image of the sample is acquired, optionally and preferably using an optical technique that provides high contrast between particles and the filter surface and especially contrast between microplastic particles and the pores in the filter surface. Suitable techniques include darkfield, fluorescence microscopy via addition of a fluorescent stain (like Nile red, for example), and autofluorescence, for example. The use of a fluorescent stain to highlight microplastics has been discussed for example in "Modification of a Nile Red Staining Method for Microplastics Analysis A Nile Red Plate Method" by Kang et al (Water 2020, 12, 3251; doi:10.3390/w12113251.)

An especially effective approach is crossed polarization microscopy, which is described with reference to FIG. 2. Crossed polarization microscopy arranges two substantially orthogonal polarizers in the optical microscope, one in the illumination path, and one in the camera path. This effectively blocks light from the sample substrate and importantly from the pores in the filter, and only passes light to the camera when the sample causes a rotation in the polarization of light reflected/scattered from the sample. The net result is a near binary image 111 where the filter material (or other substrate) 115 appears essentially black whereas microplastic particles e.g. 113 appear bright. Contrast enhancement techniques can be used to adjust the data range of the crossed polarization image to maximally cover the displayed color levels. Thresholding can also be applied to create a binary image with brighter regions coerced to a maximum value and darker regions coerced to a minimum value.

At 120, the high contrast optical image can be analyzed to determine the location and optionally various size parameters for a population of microplastic particles. Many suitable algorithms can be used for determining particle positions and size parameters. For example, OpenCV has library functions for image thresholding, blob detection, edge detection and other related features. Particle identification can optionally include any number of prefiltering steps (e.g. field flattening, low pass filtering, median filtering, and for example Otsu's method thresholding), to create a binary image separating the image into filter background and particle foreground. Particle borders can be then defined via "watershed segmentation" (Beucher, S. and C. Mathmatique, The Watershed Transformation Applied To Image Segmentation. Scanning. Microsc., 2000. 6), or similar algorithms. Depending on the density of particles, additional algorithms can be employed to erode and divide overlapping particles. Once particles are identified, algorithms can be used to analyze the size, area, perimeter, circularity and any other morphological characterization. Color images can also be obtained on the population of microplastic particles to add color characterization of each particle if desired. The particle positions and other attributes can be assembled into a "particle table" that can then be used to initiate automated spectroscopic analysis of the microplastic particles.

At 130, one or more position offsets corrections between particle position coordinates as measured from the optical image at 110-120 can be determined, and X-Y position coordinates can be applied to a positioning stage to position the sample relative to the OPTIR probe beam and/or the probe beam relative to the sample. The positions determined at 110-120 will generally comprise the centers of mass for a population of microplastic particles, given in pixel coordinates for the optical image. It is then necessary to convert the pixel coordinates into positioning stage coordinates, taking into account possible nonlinear scale errors on the image and/or positioning stage, as well as origin offsets and possible rotation between the camera image and the positioning stage translation axes. Nonlinear distortions in the optical image can include barrel/pincushion and/or higher order distortions. These issues can have a substantial impact if not carefully considered and compensated. For example, consider a low magnification optical image with a field of view of 1.0 mm. If this image has image distortions at the scale of even 0.5%, this would lead to a maximum position error of 5 µm, an error that is larger than the size of many target particles. In practice it is desirable to achieve an overall positioning error of less than 1 µm or more preferably less than 0.5 µm. This can be achieved in a variety of ways. First, it is possible top correct for image distortion/rotation by acquiring an image of a known reference sample and then determine the measured optical positions of objects with known XY positions. For example Thorlabs and other optical vendors sell calibration/distortion targets for mapping image distortions. Once the distortion field is known, it can be inverted to convert measured coordinates in the image space into corrected coordinates in real-space. Positioning stages can be similarly calibrated using calibration standards, interferometric measurements, or other techniques. It is also possible to use the probe beam of an OPTIR instrument to calibrate the position corrections. For example, it is possible to scan the sample under the probe beam or scan the probe beam over a sample while recording the DC intensity of scattered/transmitted light to produce an image that is similar to a brightfield or transmission image. This image can be cross-correlated with a widefield optical image or even a polarization image from 110 to produce a correspondence map or function that translates image coordinates into real space coordinates, and more specifically into stage coordinates. If imaging a population of microplastic particles, it is possible to perform this correction calibration for a single point or over a plurality of particles. One semi-automated approach is to automatically acquire an OPTIR DC image of a single particle and then ask the user to click in the center of the particle image. The software can then calculate the offset between the position the user clicked and the nominal expected center location. This offset ($\Delta x$, $\Delta y$) can then be applied to every subsequent sample position before a particle analysis by OPTIR. Alternately, multiple offsets ($\Delta x_i$, $\Delta y_i$) can be determined for a plurality of different particles, especially when the optimal offset varies as a function of image position. In either case, a correction is applied for each particle to be measured to ensured that even very small particles are adequately centered in the OPTIR probe beam before measurements.

At 140, OPTR spectroscopic measurements are acquired at a plurality of XY locations corresponding to positions of particles from the particle table. The resulting measurements are a series of spectra 141 that correspond to different microplastic particles.

At 150, the chemical identification of a plurality of microplastic particles is determined by performing a spectral search against a database of known reference spectra. Typically, a measured spectrum is compared against spectra in a reference library and a hit quality index (HQI) is calculated for each searched reference spectrum, as shown in chart 151 comparing sample data (dotted lines) against a known spectrum 153 of poly methyl methacrylate (PMMA), with an HQI of 0.903. The hit quality index can be calculated using any of a range of metrics, including but not limited to: cross-correlation, Euclidean distance, cosine similarity, machine learning approaches such as support vector machines and artificial neural networks. It may be desirable to perform any number of pre-processing steps prior to correlation searching, for example normalization, smoothing, baseline correction, mean centering, wavelength correction, first or second derivatives, ATR correction, and/or other forms of filtering and pre-processing. Once a hit quality index is calculated for each reference spectrum, one or more candidate "hits" can be presented, including the corresponding material identification and the associated hit quality index or "score". This process is repeated for every measured OPTIR spectrum (or at least for OPTIR spectra with a signal-to-noise ratio.

At 160 the results are concatenated into a particle summary report 161. The report can include the particle positions, sizes, area, aspect ratio, circularity, and/or any other desired morphological or color parameters. It is also possible to use morphological factors to indicate what type of particle, e.g. spherical, irregular, fiber, fragment, etc.

A key improvement of the method described with respect to FIG. 1 above is generating a high contrast image that highlights the particles relative to the background of the filter or other substrate. We have implemented two approaches with high success rate for high contrast images of microplastic particles: (1) crossed polarization; and (2) autofluorescence. Each will be described below.

Figure 2:
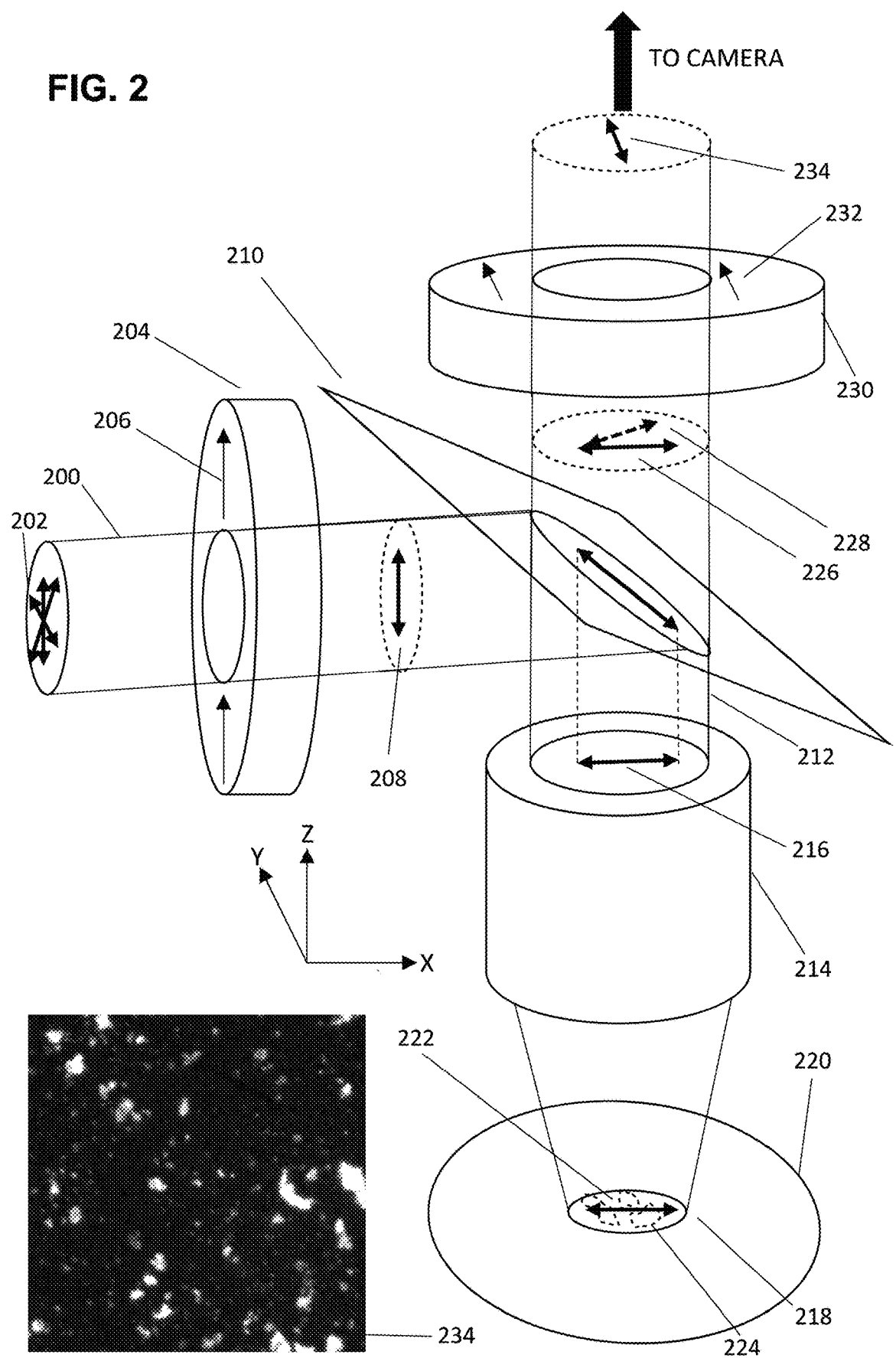
FIG. 2 shows a simplified illustration of a form of polarization optical microscopy used to detect microplastic particles.

Crossed Polarization Detection of Sub-20 µm Microplastic Particles from Amorphous Materials Crossed polarization imaging of microplastic particles is illustrated in FIG. 2. An illumination light beam 200, typically with random incident polarization as indicated by arrows 202 passes through a polarizer 204 with a first polarization angle shown by arrow 206, resulting in a beam polarization of the transmitted beam as shown by arrow 208. The illumination beam in then incident on a beam splitter 210 that reflects the beam 212 onto the back surface of objective 214. In the example shown, the polarization at the back of objective 214 is in the X direction as shown by arrow 216. The initial polarization direction can be changed to any arbitrary angle, but is selected to be along the X direction for the purposes of this example.

Objective 214 focuses the illumination light to a spot 218 on the sample 220 with a polarization direction indicated by arrow 222, generally similar to the input polarization direction shown by arrow 216. The sample 220 contains a plurality of particles 224 that are illuminated by the illumination spot 218. Scattered/reflected light is then recollected by objective 214 and passes though beam splitter 210. The collected light will generally have light with multiple polarization angles, a portion of the light with the original polarization direction, as indicated by arrow 226, and a portion of the light with rotated polarization as indicated schematically by arrow 228. The rotation angle is intended to be illustrative only and not to scale.

A second polarizer 230 is place in the collected beam path, generally with a polarization axis substantially perpendicular to the incident illumination polarization. In the example shown, polarizer 230 has a polarization axis indicated by arrow 232 which is oriented along the Y axis, substantially orthogonal to the illumination polarization at the sample oriented along the X axis. Polarizer 232 substantially blocks the unrotated illumination light from the sample and primarily passes light from regions of the sample that have undergone polarization rotation. As will be discussed below, the polarization rotation is a highly efficient mechanism for discriminating microplastic particles from the filter substrate and filter pores. Note that in the case that the incident beam 200 is already polarized (for example using an intrinsically polarized light source like a laser, then first polarizer 204 can be omitted. Note that in the context used herein crossed polarized microscopy refers to the use of a polarizer in the camera path to block light of unrotated polarization, but does not specifically require two polarizers at substantially orthogonal orientations. More generally polarization microscopy does not necessarily require crossed polarizers, but rather any imaging technique that is substantially sensitive to polarization rotation, for example polarization modulation microscopy, microellipsometry, polarization-sensitive optical coherence tomography, and Stokes polarimetry.

Sierra et al have employed polarization microscopy to microplastic particles in wastewater (see "Identification of microplastics in wastewater samples by means of polarized light optical microscopy," Environmental Science and Pollution Research (2020) 27:7409-7419, https://doi.org/10.1007/s11356-019-07011-y.) Sierra used polarization microscopy to detect larger microplastic particles in the size range 70-600 µm in samples of wastewater, and identified classes of microplastic materials with sufficient optical activity, i.e. the ability to rotate optical polarization, to be detectable with crossed polarization microscopy.

Prior Research Teaches Away from Use of Cross-Polarization Microscopy for Some Plastics The Sierra paper also identified an inherent weakness in their approach: "A major limitation was found in the identification of MP from non-birefringent polymers such as PVC (polyvinylchloride)." The paper in fact classified microplastic particles by whether they showed "optical activity" (the ability to rotate polarization of light) or "no optical activity." Among the materials identified with minimal or no optical activity were PVC (polyvinyl chloride) and PPMA (polymethylmethacrylate), and some samples of PE (polyethylene) and PA (polyamide). The paper further explains that non-crystalline polymers like PVC and PMMA show minimal optical activity and hence were not detected via polarization microscopy. This prior research concluded that polarization microscopy would be suitable to detect some microplastic materials, but it would be unsuitable for other materials. Many common polymers, in fact can be amorphous (i.e. non-crystalline), for example atactic polystyrene (PS), PMMA, high-density polyethylene (HDPE), polyvinylchloride (PVC), polycarbonate (PC), some forms of polyethylene terephthalate (PET), polyvinyl acetate (PVAc), and polytetrafluoroethylene (PTFE, e.g. Teflon). This would lead to the expectation that many important plastics would not be readily detectable via crossed polarization microscopy.

Unexpected Optical Activity in Small Microplastic Particles of Bulk Amorphous Polymers The inventors have discovered, however, that in practice crossed polarization microscopy is highly effective at detecting small microplastic particles, even when composed by materials that in bulk are nominally amorphous and hence would be expected to be non-birefringent. The inventors have specifically used crossed polarization microscopy to detect sub-20 µm particles of PMMA, PS, HDPE, and PC, all of which are nominally amorphous and would be expected to be non-birefringent in bulk samples. The apparatus of FIG. 3 has also been used to detect and measure microplastic particles of polyethylene (PE) and polyamide (PA) which in some cases showed no optical activity in the Sierra publication.

There are several mechanisms to explain the unexpected successful detection of sub-20 micron microplastic particles via crossed polarized microscopy.

First, the successful detection of sub-20 µm particles may be due to mechanical stresses in fragmentation. Microplastic particles are often breakdown products from larger particles and/or bulk plastics. For a larger plastic particle to break into micron scale microplastic fragments, they may have been subjected to stresses in excess of their yield strength. Such stresses can cause molecular orientation effects that can lead to optical activity.

Small scale non-uniformity can also result in detectability of sub-20 μm particles. Polymers that are considered amorphous or non-crystalline in bulk may contain molecular order over smaller length scales. Micron scale particles therefore may contain local anisotropies that can provide optical activity and polarization rotation.

Scattering may also result in detectability. When the particles are similar in size relative to the wavelength of the illuminating light, e.g. micron scale, Mie scattering has a complex dependence on the scattering angle and can change the polarization state.

Reflection on small particles may also explain the detectability. The reflection coefficient depends on polarization and angle of incidence. For small particles with high curvature, the illumination light can encounter a wide range of surface angles causing a distribution of reflection which can alter the polarization of the reflected light.

Multiple scattering on small particles may also explain the detectability. Light may scatter off multiple surfaces of a particle resulting in polarization rotation.

Experiments suggest that, contrary to what one would have assumed was detectable based upon the available publications, one or more of these mechanisms provide for enhanced detection of the vast majority of microplastic particles, including polymers that are normally considered amorphous/non-crystalline, and/or that are not expected to be optically active.

Figure 3:
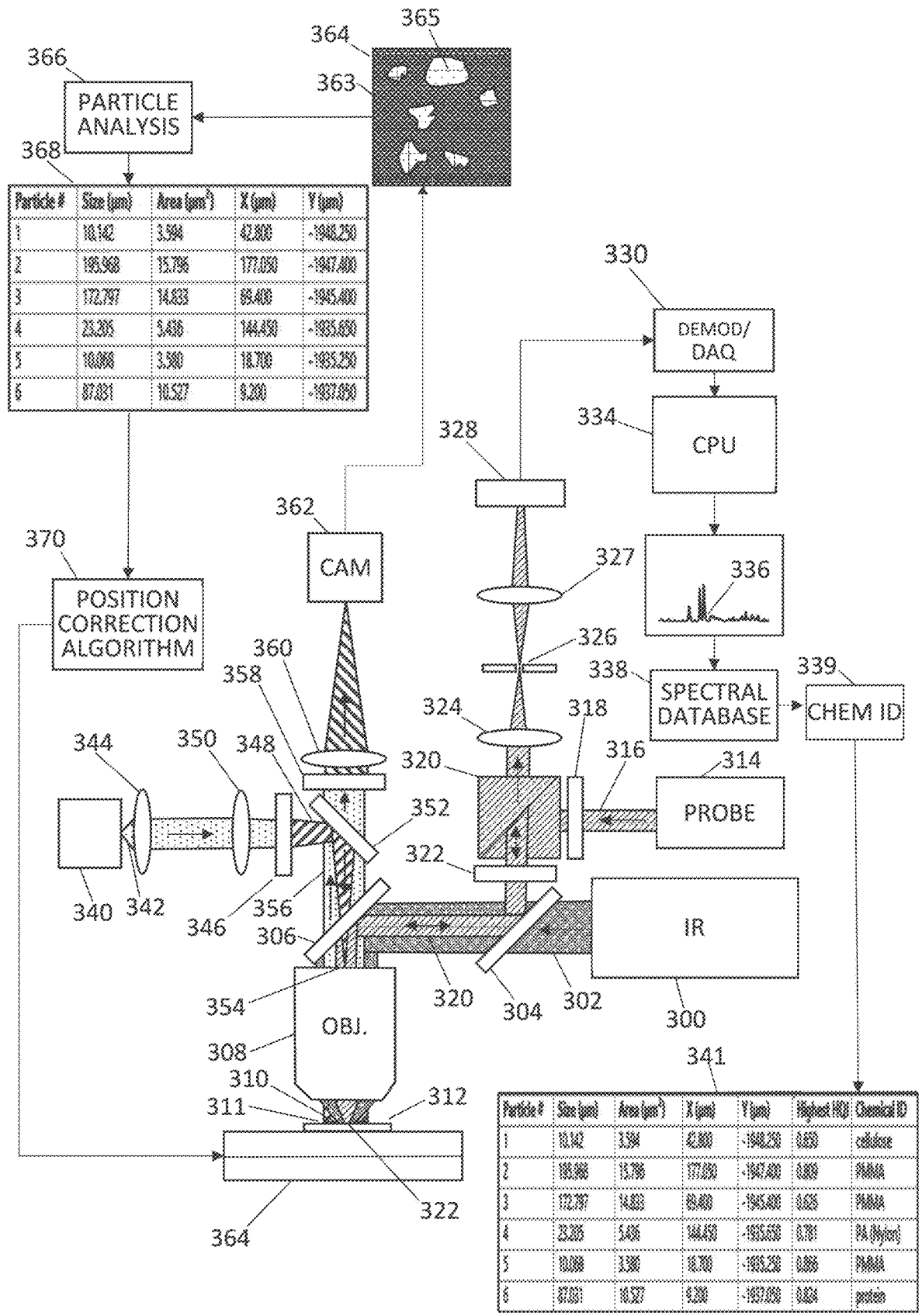
FIG. 3 shows a simplified schematic diagram of an apparatus for automated detection and analysis of microplastic particles.

FIG. 3 is a simplified schematic diagram of an apparatus for the rapid, automated analysis of microplastic particles by OPTIR. An illumination light source 340 emits a beam of light 342 that is optionally collected and/or generally collimated by collector optic 344 and then passed through first polarizer 346. The polarized illumination beam 348 is optionally focused by one or more additional optics 350 including beamsplitter 352. In the case of Kohler style illumination, the light from the illuminator may be focused at the back focal plane 354 of objective 308. In any case, this arrangement provides for a region of the sample to be illuminated by a spot of polarized light 311.

As described associated with FIG. 2, microplastic particles in the sample 312 can cause rotations of polarization of reflected/scattered/transmitted light. In the configuration shown, after the illumination light interacts with the sample, backscattered/reflected light is collected by object 308 and transmits through beam splitter 352 where the light encounters a second polarizer 358 which substantially blocks light at the original illumination polarization and passes light where the polarization scattered/reflected light has been rotated via interactions with a microplastic particle. In the case of a transmission configuration an additional objective would be placed on the opposite side of the sample and the second polarizer would follow the second objective.

In the configuration shown in FIG. 3, light from the sample after polarizer 358 is then focused by one or more focusing optics 360 (e.g. a tube lens) onto the surface of a camera 362 which in turn produces a polarization image 364 of the sample, comprising substantially dark regions 363 associated with the background filter/substrate and lighter regions 365 corresponding to the microplastic particles.

Note that this configuration can easily be converted to use for fluorescence microscopy as an alternative or addition to crossed polarization microscopy. For example, polarizer 346 can be exchanged for a fluorescence excitation filter, beamsplitter 352 can be exchanged for a suitable fluorescence dichroic, and polarizer 358 can be exchanged for a fluorescence emission filter.

Next, one or more polarization images 364 (and/or fluorescence images) of the sample are then processed by particle analysis software 366 that computes particle parameters like size, area, and coordinate positions (X, Y) of particles found in the image 364, which are in turn used to populate a particle summary table 368. An optional position correction algorithm 370 can be applied before or after the generation of the particle summary table to create position offsets to be applied to particle positions calculated in the particle analysis software 366. The particle positions from the particle summary table with optional position corrections are used to sequentially position the sample for OPTIR spectroscopic analysis of a plurality of microplastic particles. In the configuration shown, the sample 312 is mounted on an XY translation stage that can rapidly move the different microplastic particles under the measurement beams of the OPTIR system.

Alternately the measurement beams of the OPTIR system can be moved relative to the sample, e.g. by scanning the objective over the sample and/or by scanning the OPTIR measurement beams within the field of view of the objective, as is done in laser scanning confocal microscopy and as is described specifically for OPTIR measurements in "Video-rate mid-infrared photothermal imaging by single-pulse photothermal detection per pixel" in SCIENCE ADVANCES 14 Jun. 2023 Vol 9, Issue 24 DOI: 10.1126/sciadv.adg8814 Any combination of translating the sample, the objective, and/or the OPTIR measurement beams can be used to measure a plurality of microplastic particles. In some embodiments, the OPTIR measurements can be performed in a widefield configuration, e.g. by using the camera 362 (or alternate camera not shown) as the OPTIR detector, as described in Applicant's earlier-filed application published as US 2023/0063843, as well as in US 2022/0381684 to Cheng et al., the contents of each of which are incorporated herein by reference in their entirety.

OPTIR Measurements of Microplastic Particles

The following section describes an embodiment of an OPTIR system for measuring IR spectra on micron scale microplastic particles, e.g. after identification and localization of particles via polarization microscopy and image particle analysis. Still referring to FIG. 3, an IR source 300 emits a beam of infrared radiation 302 which passes though optional dichroic 304 and then is directed by reflector 306 to be incident on objective 308 which focuses the IR radiation to a spot 310 on a portion of sample 312, where the sample comprises a population of microplastic particles on a filter or other substrate. IR source 300 is tunable and/or broadband such that it can excite the microplastic particles in sample 312 over a plurality of infrared wavelengths, e.g. corresponding to different absorption bands that are common in polymeric materials. In one embodiment the IR source 300 can be swept across at least a portion of the IR fingerprint region, e.g. at least a subset of the region from 400-2000 $cm^{-1}$. Additional tuning ranges may be supported as well, for example the CH/single bond region covering roughly 2700-3600 $cm^{-1}$. The sample is also illuminated with a probe beam to measure photothermal changes in the sample due to absorption of infrared light. For example probe beam source 314 emits a beam of probe radiation 316 that optionally passes through a polarizer and/or waveplate 318 prior to entering a polarizing beams splitter 320. A portion of the probe radiation is reflected out of the polarizing beam splitter 340 and passes through optional wave plate 322. In one embodiment, waveplate 318 is a half wave plate and waveplate 322 is a quarter waveplate. In this configuration, the polarization of the probe beam after wave plate 322 is elliptical. Dichroic 304 in the configuration shown is arranged to be reflective to the probe beam wavelength and transmissive to the IR beam wavelengths, thus combining the IR and probe beams collinearly. The inverse configuration can also be used where the dichroic is reflective to IR light and transmissive to probe light.

The collinear IR and probe beams are reflected together via reflector 306 to objective 308 where the probe beam is also focused to a spot 322 on the sample 312, at least partially overlapping with the IR illuminated area 310 of the sample. Absorption of IR radiation by microplastic particles in the sample cause local temperature increases in the microplastic particles which in turn causes subtle changes their size and reflective/scattering properties. These photothermal changes in the sample thus cause a change in the intensity and distribution of probe light reflected, scattered, and/or transmitted from the sample. Probe light leaving the sample can be recollected by objective 308 in an epi configuration or alternately/additionally collected by an additional objective or collection optic (not shown) on the same side or opposite side of the sample. Collecting light on the opposite side would comprise a transmission detection configuration.

In the epi-detection configuration shown, probe light collected from the sample is reflected by reflectors 306 and 304 back through waveplate 304 to polarizing beam splitter 322. Wave plate 322 can be used to create a 90° polarization rotation such that probe light returning from the sample is transmitted through the polarizing beam splitter 320. The collected probe light can then be optionally focused by optic 324 to confocal pinhole 326 and then optionally refocused by one or more additional optics 327 to one or more detector 328. Signals from the detector(s) are analyzed via a demodulator/data acquisition system 330 to produce a signal that is indicative of IR absorption by the microplastic particle sample. More specifically, the demod/DAQ system 330 with alone or in combination with additional computation means (e.g. a CPU or other numeric processor) determines a change in the collected probe radiation that is coordinated with pulses and/or modulation of the energy of the IR beam 302. The signal indicative of IR absorption is measured over a plurality of IR wavelengths/wavenumbers to produce a multi-spectral measurement of the IR absorption of the particle. The IR source can be swept continuously over a range of wavelengths in the mid-infrared, for example to construct a measurement indicative of an infrared absorption spectrum 336 of the microplastic particle. The system can alternately perform a plurality of measurements of the signal indicative of IR absorption at a discrete number of wavenumbers, i.e. corresponding to common spectral peaks in polymeric materials. For example, measurements of IR absorption at a discrete number of IR wavelengths (e.g. 5-10) can also be used to discriminate common classes of polymers. In either case, the measurements of IR absorption of the microplastic particle at a plurality of IR wavelengths is then compared against a spectral database 338 to determine if the measured spectrum 336 is a good match against any spectra in the database.

In one embodiment the measured spectrum 336 is compared against at least a subset of the reference spectra in the spectral database and a hit quality index (HQI) is calculated for each reference spectrum analyzed. If the highest HQI is above a user configurable threshold, the chemical composition of the highest HQI reference spectrum is returned as the chemical identification (CHEM ID, 339) of the microplastic particle in question. After all particle spectra are analyzed against the reference database, the HQI and Chemical IDs can be added to the particle summary table 341. Confocal pinhole 326 can be especially helpful for spectroscopic analysis of microplastics for a few reasons. First, microplastic particles can have many surfaces that scatter light and can lead to a complex pattern of collected probe light. A confocal aperture can clean up the optical beam for more robust detection of IR absorption from the sample. The confocal pinhole 326 also can provide an improved and higher speed autofocus to optimize the focus height of objective 308 relative to the microplastic particle. Traditional OPTIR autofocus has been performed on the OPTIR signal itself at a specific infrared wavelength. But for an unknown particle, it can be difficult to determine what wavelength is optical for such an autofocus. Use of a confocal aperture makes it possible to use the collected probe beam intensity (the so-called DC signal) for an autofocus independent of the IR wavelength. Because the DC signal does not require demodulation synchronous with the IR pulses, a DC autofocus can be extremely fast, thus minimally impacting overall measurement throughput.

Figure 4A:
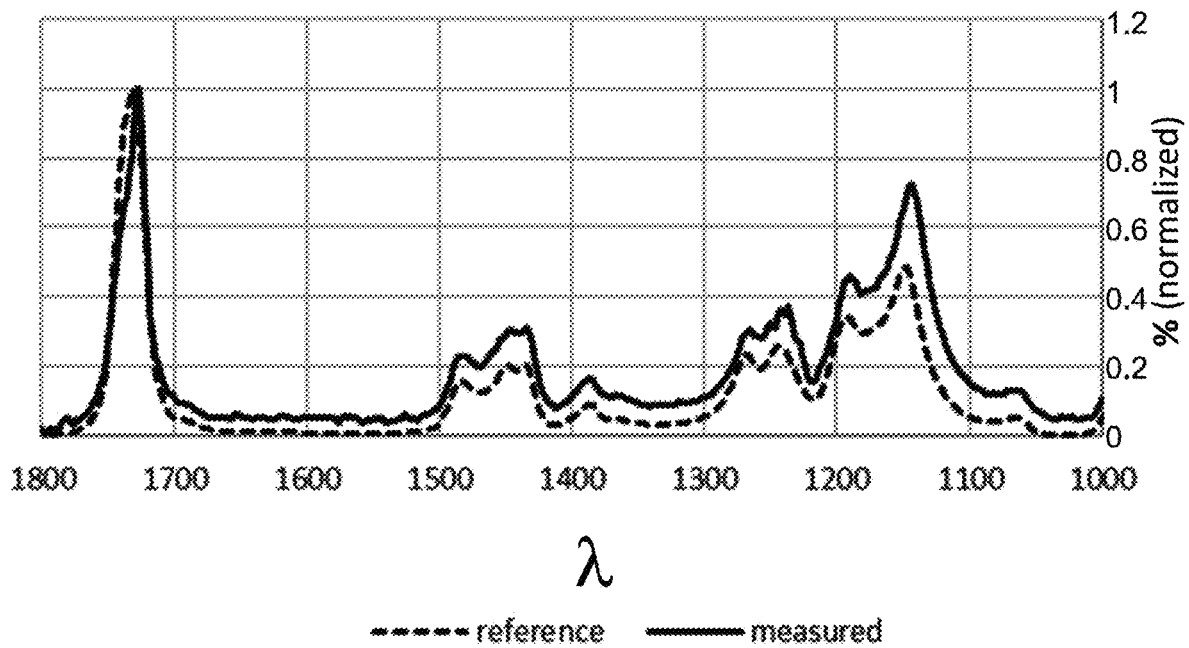
FIGS. 4A-F show example OPTIR spectra automatically measured on microplastic particles after detection by polarization microscopy, including microplastic particles composed of materials that generally do not show bulk birefringence.
Figure 4B:
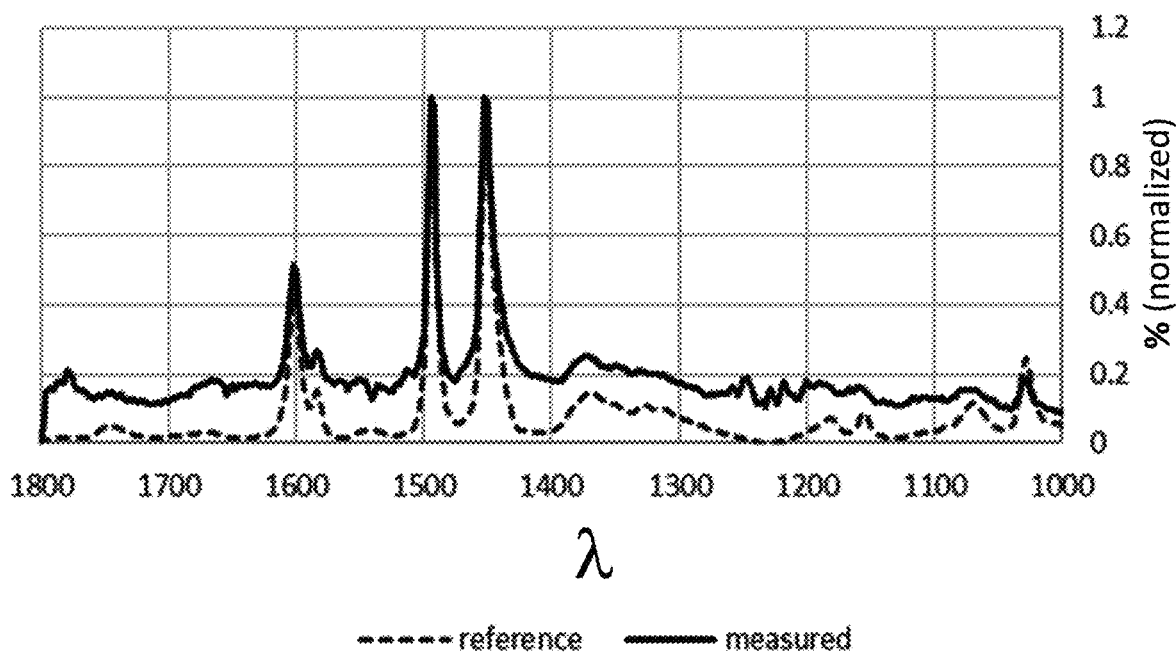
Figure 4C:
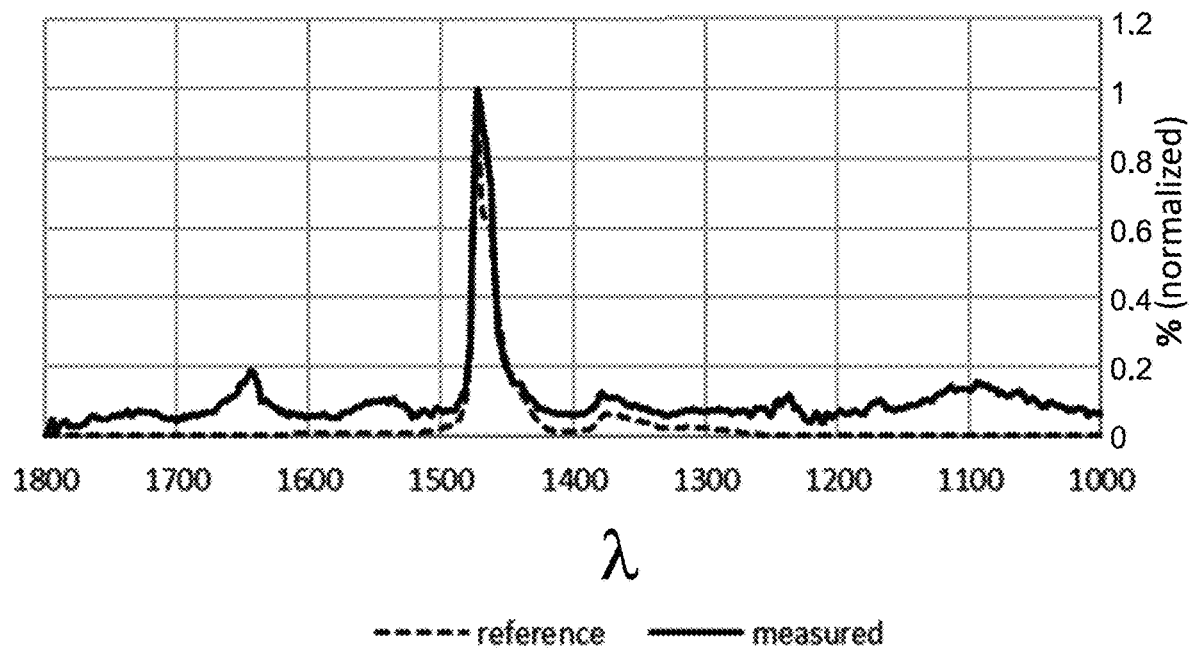
Figure 4D:
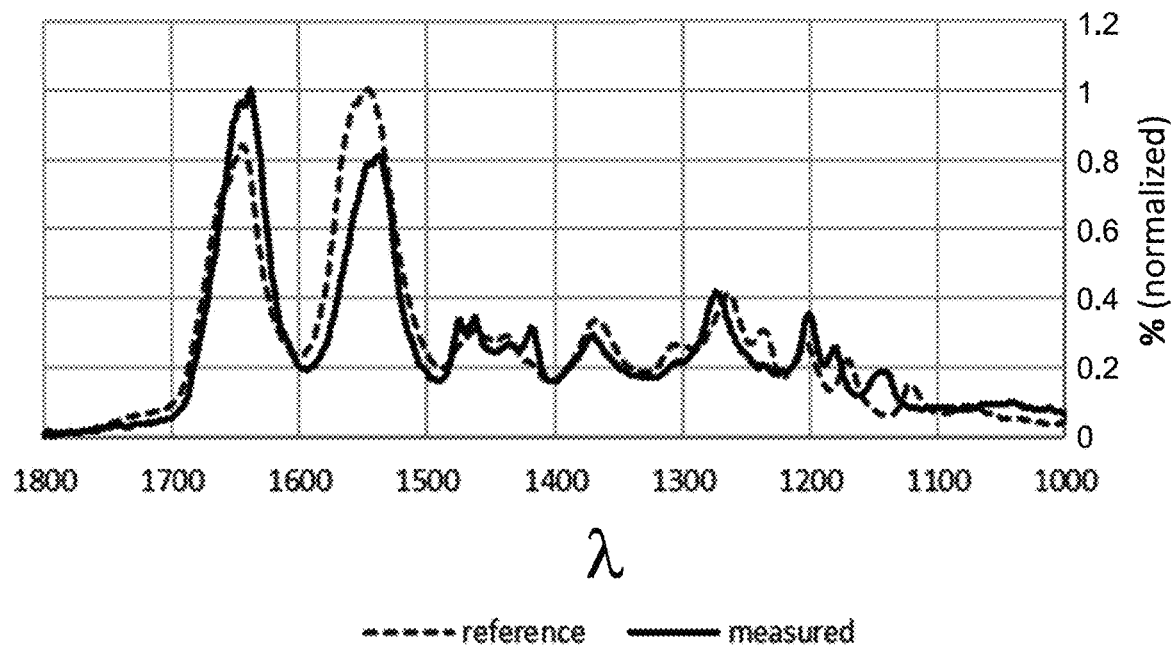
Figure 4E:
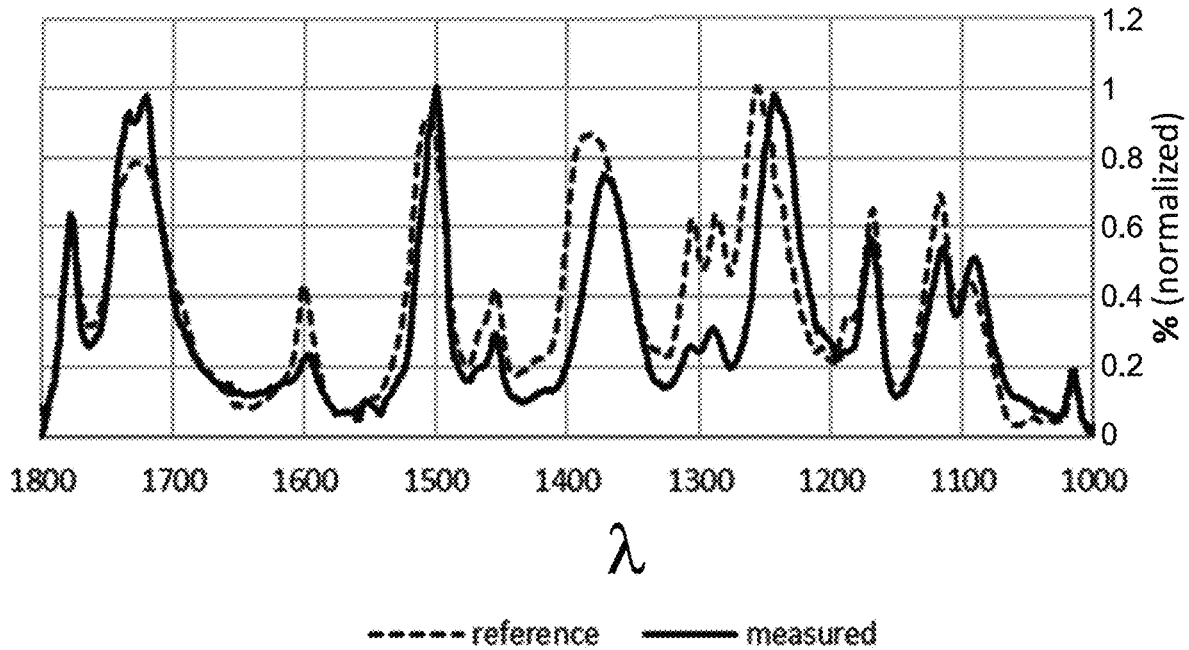
Figure 4F:
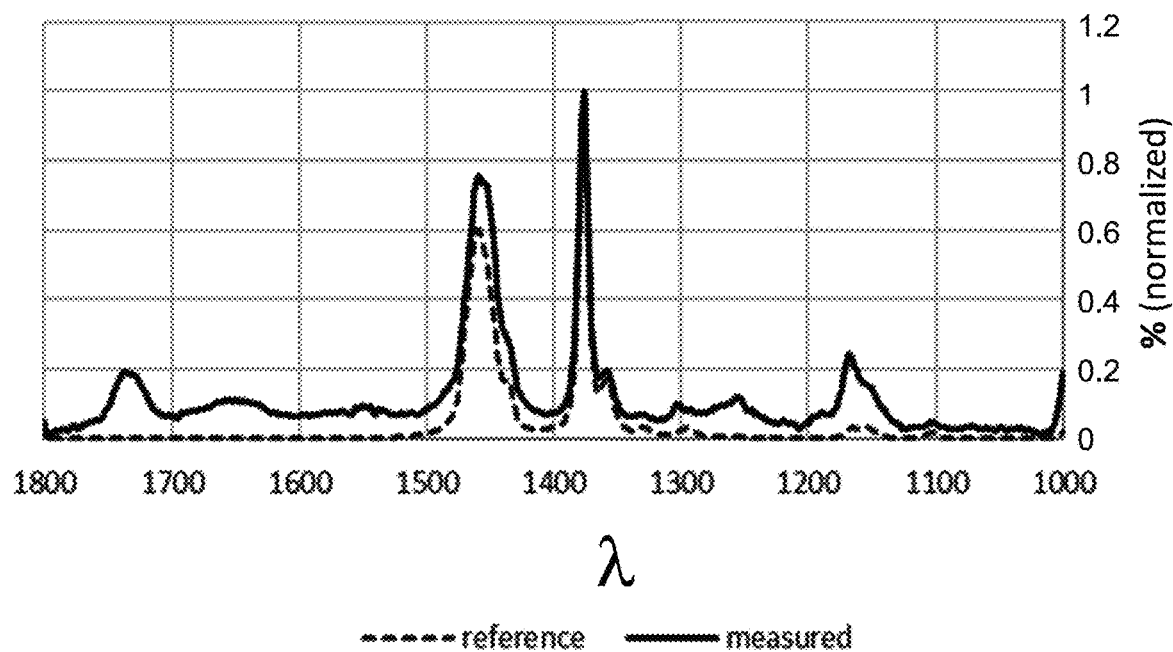

FIGS. 4A-F shows OPTIR spectra automatically measured on a variety of microplastic particles measured identified using crossed polarization microscopy using the methods and apparatus described associated with FIGS. 1-3. The polymer abbreviation for the best match chemical ID is notated above each plot. FIG. 4A: PMMA=polymethylmethacrylate, FIG. 4B: PS=polystyrene, FIG. 4C: PE=polyethylene, FIG. 4D: PA=polyamide, FIG. 4E: PI=polyimide, FIG. 4F: PP=polypropylene. For each plot the measured spectrum is shown in a solid trace whereas the best match reference spectrum is shown with dashes. Note that PMMA and PS are both generally amorphous materials and hence would be expected to be non-birefringent, but both were readily detected by crossed polarization microscopy in the sub-20 µm diameter size range.

Figure 5:
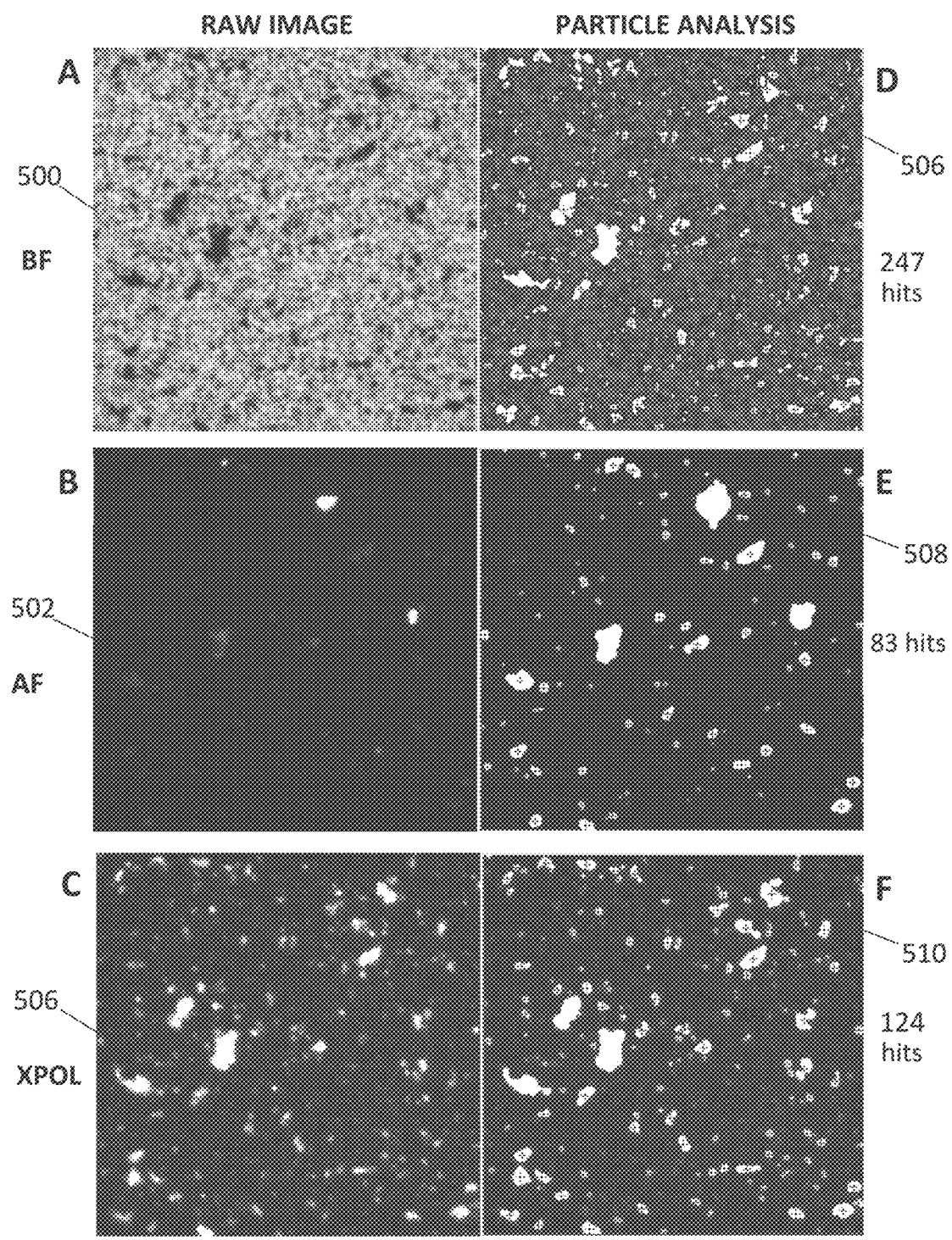
FIG. 5 shows examples of optical microscopy images and corresponding particle analysis maps using brightfield, autofluorescence, and crossed polarization microscopy.

FIG. 5 shows the benefits of the use of crossed polarization microscopy for detection and characterization of small microplastic particles. FIG. 5A-C shows three images of the same region of a sample of microplastic particles on filter membrane obtained with different optical microscopy techniques. FIG. 5A shows a brightfield (BF) image 500, FIG. 5B shows autofluorescence (AF) image 502, and FIG. 5C shows a crossed polarization (XPOL) image 504. Each image covers a 296 µm field of view and was taken on a population of microplastic particles on a gold coated polycarbonate membrane filter with 0.8 µm pore sizes. FIGS. 5D-F show the results of applying thresholding particle analysis to each of the raw images 500, 502, and 504 in FIGS. 5A-C. Crosshairs indicate where putative particles were detected.

The particle analysis in FIG. 5D on the BF image 500 in FIG. 5A resulted in 247 hits found in threshold image 506 in but a very large number of these "particle" hits are false positives associated with the pore structure in the filter. Attempts at performing automated OPTIR spectral analysis on the locations identified by crosshairs in image 506 results in a lower than desired success rate since many of the locations marked do not in fact contain a microplastic particle, but instead two or more closely spaced pores or other contrast deviations not associated with microplastic particles. Image 508 in FIG. 5E is a threshold particle analysis image of autofluorescence (AF) image 502 from FIG. 5B. This analysis found 83 particles and with a very high confidence that the cursors mark the locations of real microplastic particles as the background filter and its pores are very effectively suppressed in the autofluorescence image. It is worth noting that such particles with high levels of autofluorescence can be difficult to measure by Raman spectroscopy because the autofluorescence can swamp the Raman signal. Autofluorescence can provide an advantageous means to highlight certain classes of microplastic particles. Autofluorescent excitation in image 502 in FIG. 5B was performed with a central excitation at UV wavelengths between 355-375 nm and detection at wavelengths 425 nm and above. This excitation/emission range reveals a significant number of microplastic particles.

The main disadvantage of using autofluorescence for particle detection is that it while many plastics are autofluorescent, many others are not, so using autofluorescence would bias the analysis of microplastic particles towards detection of autofluorescent microplastics while suppressing measurements of non-autofluorescent plastics. This could skew analysis of the distribution of plastics detected in environmental samples. Particle analysis image 510 in FIG. 5F, by comparison, which was performed on the XPOL image 504 from FIG. 5C, identified 124 particles, finding 50% more microplastic particles than the autofluorescence image 508. The XPOL particle image has a very high yield of read microplastic particles enabling successful particle identification by OPTIR. Note that it is possible to combine two or more images, for example an autofluorescence image and a crossed polarization image to in some cases detect and locate a larger fraction of microplastic particles than can be detected by a single technique.

High-Speed, High Reliability Spectroscopic Analysis of 2-20 µm Microplastic Particles Key metrics of this process involve the number of particles analyzed per hour and the percentage of successful chemical identifications of microplastic particles. Using the methods and apparatus described herein, the developers have achieved high quality measurements of sub-20 µm microplastic particles at rates higher than 100 particles per hour, in some embodiments as high as 160 particles per hour. The systems and methods described herein can also achieve successful chemical identification rates above 50%, or in some embodiments successful chemical identifications rates as high as 80%.

To our knowledge, no other technique has been able to accomplish such high speed, high reliability spectroscopic analysis of micron scale microplastic with diverse chemical composition particles of the majority of common plastics, including dark and colored plastic particles.

The following section will discuss some key aspects of the current methods and apparatus that lead to high spectroscopic analysis throughput and chemical identification accuracy:

Low Optical Power for IR and Probe Beam

A key factor for reliable OPTIR spectra on a wide variety of microplastic particles is the use of very low IR and probe beam power, for example around 200 microwatts each of IR and probe beam power. Sub-20 µm microplastic particles have small thermal mass and use of high IR/probe beam power can lead to thermal/photo damage. Even IR and probe beam powers lower than the damage threshold can cause sufficient photothermal distortion to induce motion/instability in the thin plastic membrane filters used to filter and support the microplastic samples for measurement. The developers have found that using IR and probe beam powers at the sub-mW level (e.g. around 200 µW) can lead to much improvement measurement stability with minimal thermal/photo damage. These microwatt power levels are generally below the range used for traditional Raman spectroscopy which generally uses mW to tens of mW or more. To support such low probe power levels for OPTIR measurements, the detector 328 is preferably a high sensitivity/low light detector, for example an avalanche photodiode (APD).

Figure 6A:
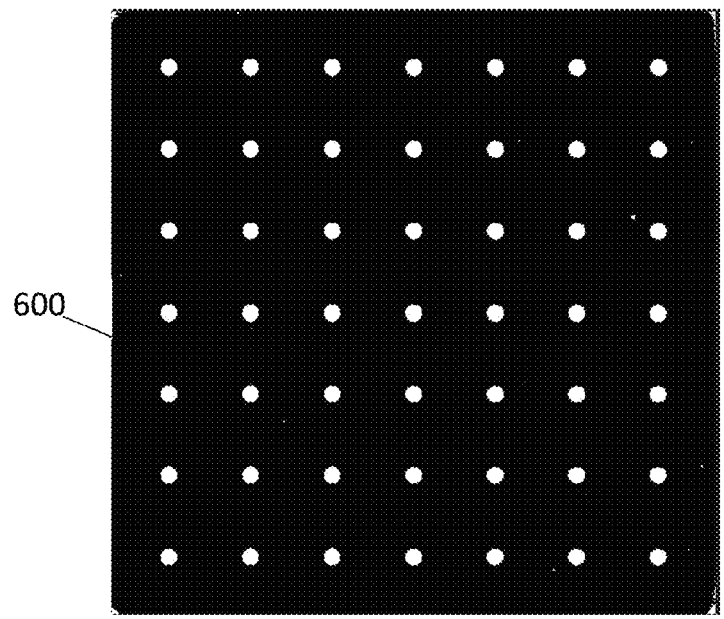
FIGS. 6A-B illustrate a method of correcting for image distortion in optical microscopy to provide improved accuracy of positioning microplastic particles for OTPIR measurement.
Figure 6B:
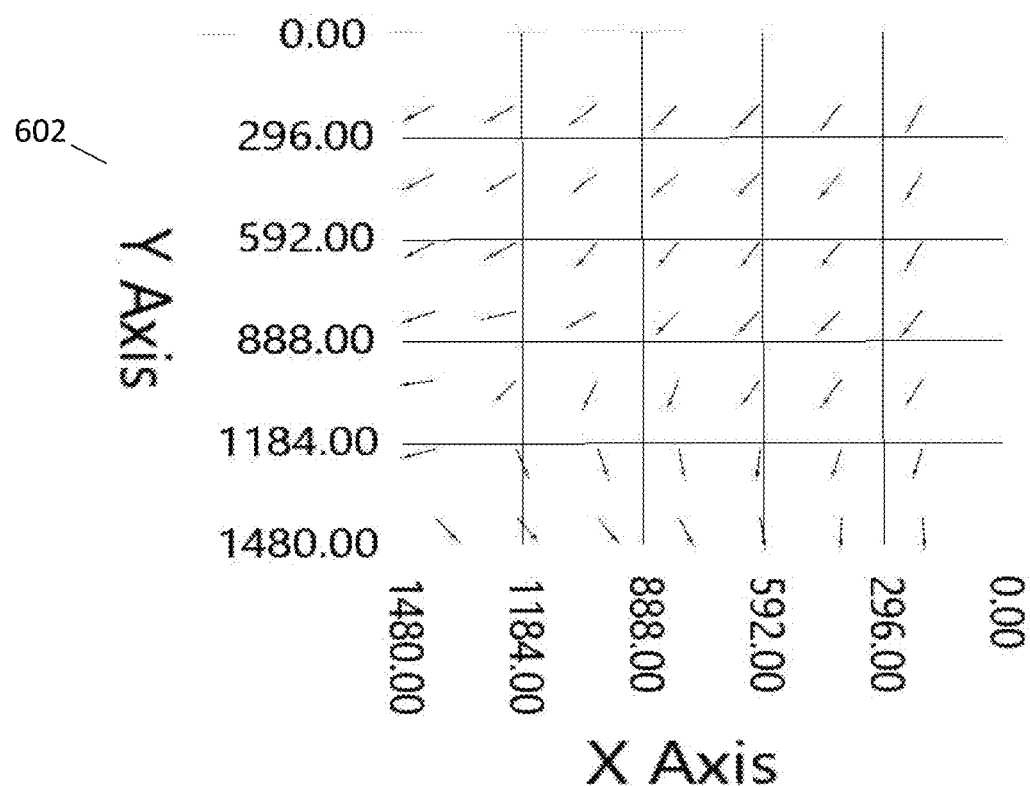

Position Corrections Applied to Particle Positions Calculated from Optical Images FIG. 6 illustrates a process for correcting for image distortions within the optical microscope field of view. A camera image is acquired on a known reference with an objective to be used for particle analysis. The known reference sample preferably has a pattern with features placed with accuracy better than required for navigating to microplastic particles of a desired size range. For example, if particles down to 2 µm will be studied, the reference sample should ideally have features with spacing known to 0.2 µm or better. FIG. 6A illustrates an optical image of an array of metal circles on a regular grid pattern with known spacing. Particle analysis was performed on the optical image to determine the centroid of the circles in the optical image as compared to the known positions of the circles. From this comparison, a correction table can be calculated, for example as shown in vector field plot 602 in FIG. 6B. The corrections as a function of XY position in the optical image can be fit for example with a polynomial or other function to correct the coordinates of microplastic particles determined from subsequent optical microscope images.

Calibration/Correction for Offsets Between Objectives

It can be desirable to use one objective, for example a lower magnification objective to perform a survey of particle positions and then a higher magnification and/or an infrared compatible objective like a Schwarzschild objective to acquire OPTIR measurements of an array of particles. There can be an offset between the centers of the fields of view of these two or more objectives and the offsets can change overtime due to thermal drift and/or mechanical inaccuracies in the mechanisms used to exchange between different objectives. For this reason, it can be desirable to measure and correct for any variations in the center positions of the survey and measurement objectives. This can be accomplished in a semi-automated, or fully-automated manner. One approach is to navigate to a reference feature (e.g. a fiducial mark on the sample or sample stage, or a particle, defect, or other recognizable feature. The location of a point on the reference feature is then marked with a cursor and/or moved to a known position in the optical image, e.g. the center of the field as marked by a crosshair. The objective is then switched to the measurement objective and the process is repeated. By measuring the XY stage motion required to center the reference feature in the measurement objective's field of view, and/or by measuring the pixel location where the feature is found in the measurement objective's field of view, it is possible to calculate the current offset between the survey and measurement objective. Once known, this offset can be applied to all subsequent coordinate positions calculated for particles in the particle analysis step. This correction can be applied in addition or in lieu of any corrections described below, depending on the relative scale of the calculated corrections.

An additional potential source of positioning error is offset can be due to variations in the position of the OPTIR probe beam relative to the optical image(s). This factor can be addressed by acquiring an OPTIR image using the measurement objective and correlating the positions of features in the OPTIR image with those in the optical image with the survey and/or measurement objective. A particularly effective approach is to use a so called "DC image" which maps changes in intensity of probe light collected from the sample as a function of XY sample position. The DC image is advantageous for two main reasons. First, it is independent of the IR absorption properties of the sample; and second it can be acquired very quickly because there is no need to demodulate a small photothermal change in intensity as is performed for conventional OPTIR chemical imaging. A cross-correlation can be performed between the DC image and the optical image to calculate an offset vector that corrects for variations in the position of the probe beam relative to the optical image. A single offset value can be calculated and applied or a correction vector field similar to FIG. 602 in FIG. 6 can be calculated if desired. This offset field can be calculated automatically and/or by a user assisted process, for example manually sliding an OPTIR DC image to best overlay an optical survey image. This image overlay/correlation can also be used to correct for any rotation between the optical images and the OPTIR image scan axes.

Figure 7A:
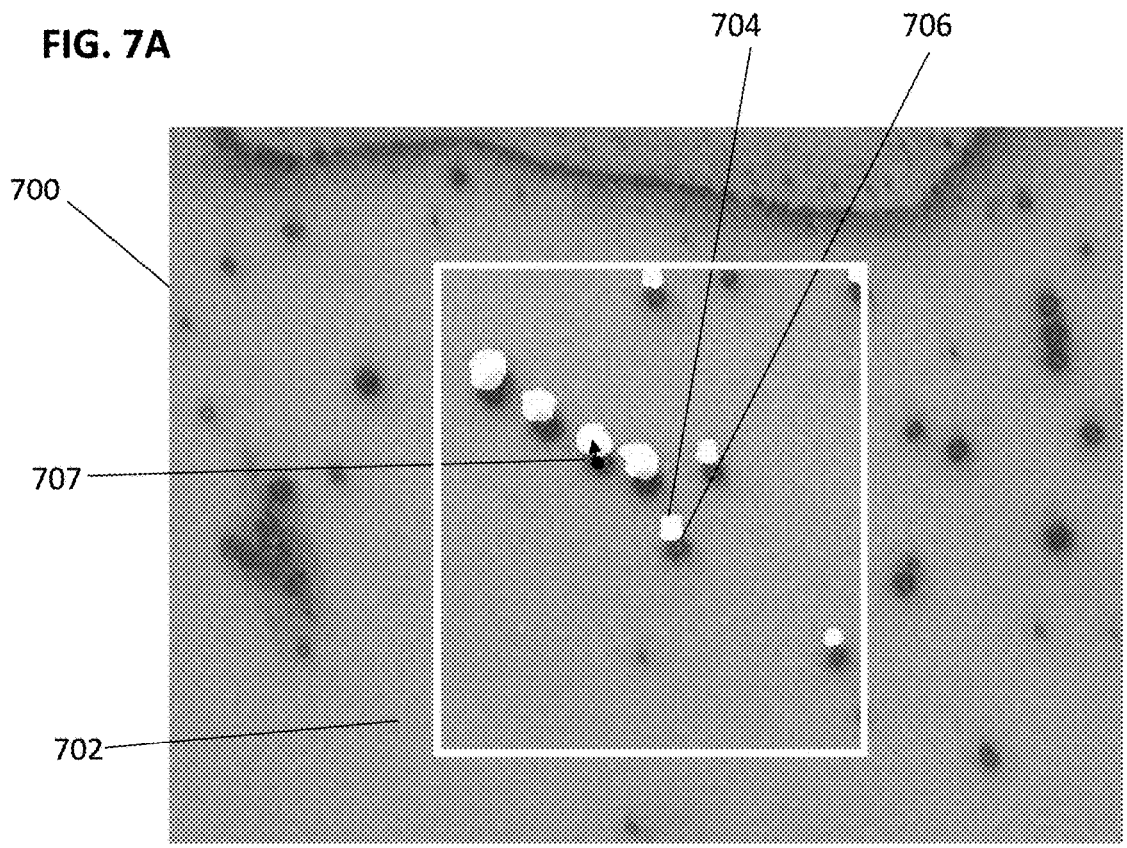
FIGS. 7A-B illustrate a method of using OPTIR DC images and optical microscopy images to calculate one or more position correction vectors to provide improved accuracy of positioning microplastic particles for OTPIR measurement.
Figure 7B:
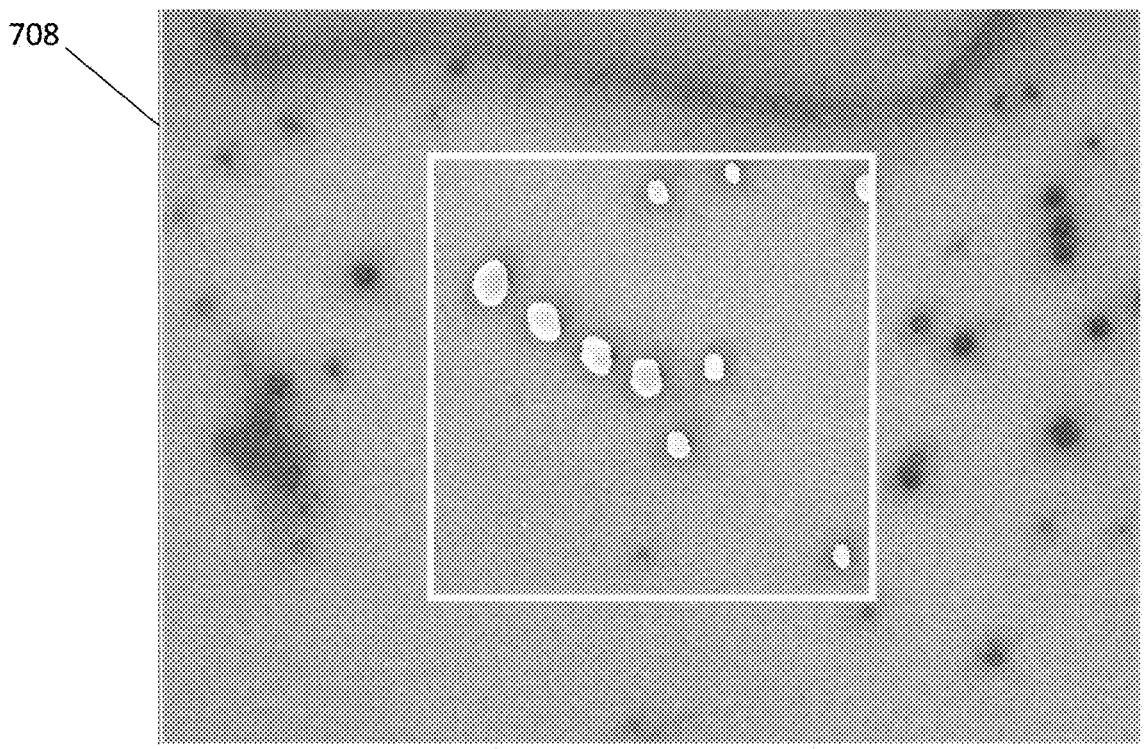

FIG. 7 illustrates the use of correlation between an OPTIR DC image and an optical survey image to calculate the offset between the probe beam and the center of an optical image. FIG. 7A illustrates a zoomed in region 700 of an optical survey image comprising a variety of particles on a substrate. Box 702 indicates the bounds of an OPTIR DC image that was acquired over a region at least partially overlapping with optical image 700. The OPTIR DC image has been changed into a binary image using image thresholding techniques and then overlaid on top of optical image 700. In the OPTIR DC overlay image, the particles have been colored white and the background has been made transparent. In this way it is possible to determine the shift necessary to overlay the image of a particle 704 in the OPTIR DC image with the image of the same particle 706 in the optical survey image. Vector 707 shows an example of the amplitude and direction of image shift needed to align OPTIR DC image 702 on top of optical image 700. Measuring this offset can produce one or more correction vectors that can be applied to subsequent OPTIR measurements of microplastic particles. FIG. 7B shows image 708 is a repeat of the process described associated image 700 after a successful alignment and correction vector has been applied. In this case note that the white spots in the OPTIR DC image are well overlapped with the particles in the optical image. Thus after this step, there is good correlation between positions measured in the optical survey image and commanded positions of the sample relative to the probe laser (or equivalently, the positions of the probe laser relative to the sample).

OPTIR Imaging for Microplastic Pre-Screening

Microplastic particles are often found with similarly sized non-plastic materials where the concentration of non-plastics may greatly exceed plastics. One study found that 66% of Raman particle spectra were uninterpretable, "suggesting a high percentage of biological material . . . (and) salt precipitates originating from the laboratory preparation itself" were present in the analyzed particles (Cabernard, L., et al., Comparison of Raman and Fourier transform infrared spectroscopy for the quantification of microplastics in the aquatic environment. Environmental science & technology, 2018. 52(22): p. 13279-13288.)

In addition to or as an alternate to a polarization microscope, it is possible to use OPTIR chemical imaging rapidly pre-screen an area of a sample to largely exclude non-plastic particles before substantial time is invested in analyzing the particles by OPTIR and/or Raman spectroscopy. This can be accomplished by rapidly assessing the IR absorption at a small number of IR bands that are generally strong absorption bands for plastics and optionally one or more bands that are generally strong absorption bands for non-plastic materials that are commingled with MP.

Figure 8:
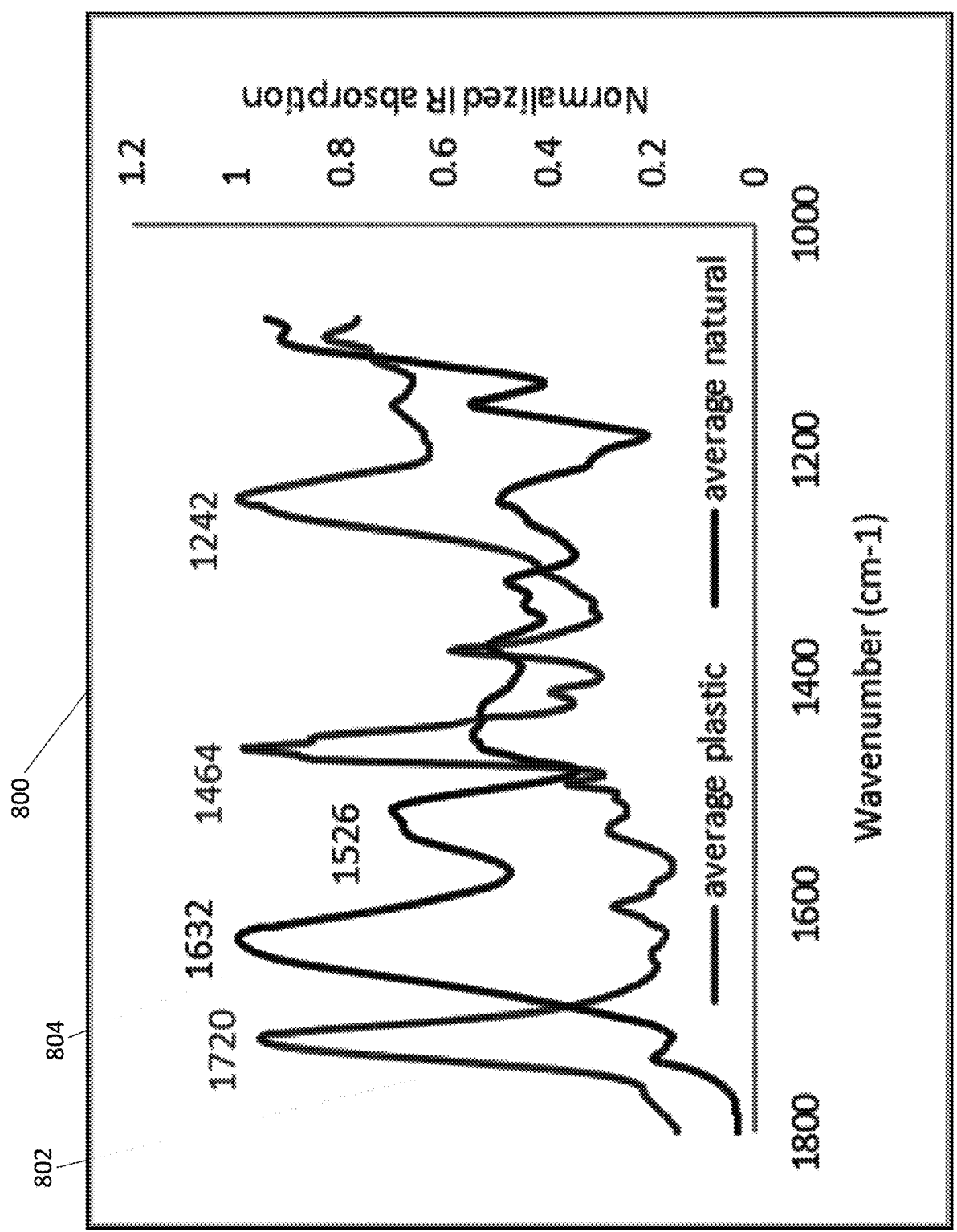
FIG. 8 shows average spectra of infrared absorption in plastic and organic materials.

FIG. 8 shows a plot 800 showing two traces, first trace 802 that represents the average IR spectra of hundreds of plastics, and a second trace 804 that represents the average spectrum of many common non-plastic natural materials that are often found in the presence of microplastics. Key absorption bands are labeled with their peak wavenumbers. From this plot it is possible to identify specific bans that can be highly indicative of the presence of polymers, for example bands at 1720, 1464, and 1242 $cm^{-1}$ and conversely bands that are strongly associated with organic matter, for example peaks at 1526 and 1630 $cm^{-1}$. Thus acquiring OPTIR images at a these or other indicative bands can provide a strong predictor whether a particle is plastic and worth selecting for a more complete OPTIR spectral analysis.

This type of pre-screening may be particularly important when microplastic particles occur with other "interferents", i.e. non-plastic particles of similar size. For example in seawater samples, common interferents could comprise particles composed of sand, plant matter, protein, bone/teeth, seashells, variety of salt compounds, and other materials. These interferents for example could contain compounds like silica, silicates, and other materials, cellulose, calcium phosphate/hydroxy apatite, calcium carbonate, etc. It is possible to catalog common interferents and use their spectral fingerprints to select IR wavelengths at which to perform pre-screening measurements to determine a likelihood that a given particle is likely to be microplastic or interferent. These screening measurements can be performed with a "loose" threshold for example to err on the side of including a tolerable number of interferents to increase the likelihood that a statistically relevant population of microplastic particles are selected for measurement. For example it a pre-screening process excludes 75% of interferents, it can still provide a significant improvement in measurement throughput without excluding every interferent. Note that the pre-screening can be performed using OPTIR images of a region of the sample and/or by performing measurements of OPTIR signal intensity at a handful of discrete bands instead of a full IR spectrum. Machine learning, deep learning, artificial neural networks and/or artificial intelligence can be used to distinguish between microplastics and interferents. For example an artificial neural network can be trained manually on a data set by an skilled spectroscopist to distinguish different particle spectra into categories of microplastic or interferents. From the training data set it is possible to then predict from the relative absorptions at a small number of IR wavelengths whether a particle is a microplastic or an interferent. The same approach can also be used to discriminate microplastics of different composition, e.g. by performing measurements at a plurality of wavelengths that correspond to common IR absorption bands in plastic materials, and especially those wavelengths that distinguish between different plastic materials.

The pre-screening described herein can use optical detection, photothermal imaging, autofluorescence imaging, crossed-polarization imaging, or any combination thereof. Some samples may be more accurately or easily screened using one or more of these techniques than with others. In some implementations, the machine-learning techniques described above can include implementing a pre-screen using a technique that an algorithm has determined is preferable, or is most likely to be preferable, to the others.

The embodiments described herein are examples only. Modifications, rearrangements, substitute processes, alternative elements, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events can be performed concurrently, rather than sequentially.

The various illustrative logical blocks, optical elements, control elements, and method steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, +10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method for automatically characterizing a sample with a population of microplastic particles with photothermal infrared spectroscopy, the method comprising:
   a) acquiring a polarization optical image of the sample;
   b) analyzing the polarization optical image to automatically identify a plurality of microplastic particle positions of the sample;
   c) based upon the plurality of microplastic particle positions, automatically positioning a microplastic particle under a probe beam of a photothermal infrared spectroscopy system;
   d) illuminating the microplastic particle with a plurality of infrared wavelengths;
   e) collecting at a detector probe beam light that is at least one of reflected, scattered, or transmitted from the microplastic particle; and
   f) measuring a change in the collected probe light from the microplastic particle corresponding to infrared absorption of the microplastic particle.

2. The method of claim 1, further comprising determining a chemical identification of the microplastic particle using the signal indicative of infrared absorption of the microplastic particle.

3. The method of claim 1, wherein the probe beam is generated by a probe beam source that is fixed, and positioning the microplastic particle under the probe beam comprises translating the sample relative to the probe beam source while the probe beam source remains fixed.

4. The method of claim 1, wherein the sample is maintained in a fixed position, and positioning the microplastic particle under the probe beam comprises translating a probe beam source relative to the sample.

5. The method of claim 1, wherein the probe beam is generated by a probe beam source that is maintained in a fixed position relative to the sample, and positioning the microplastic particle under the probe beam comprises translating the probe beam relative to a field of view of a focusing optic prior to interaction with the sample.

6. The method of claim 1, further comprising repeating c) and d) to illuminate on the plurality of microplastic particles corresponding to at least some of the plurality of microplastic particle positions.

7. The method of claim 1 wherein the microplastic particle has an effective size of less than 20 micrometers in at least one dimension.

8. The method of claim 1 wherein the microplastic particle has an effective size of less than 5 micrometers in at least one dimension.

9. The method of claim 1 wherein the polarization optical image is created using crossed polarization microscopy.

10. The method of claim 1 wherein the polarization optical image comprises images of microplastic particles of polymers that do not show bulk birefringence.

11. The method of claim 1 wherein the polarization optical image comprises images of microplastic particles of polymers that are substantially amorphous in bulk.

12. The method of claim 1 wherein the measuring comprises analyzing a distribution of image pixel brightness in the polarization optical image to create a list of microplastic particle positions.

13. The method of claim 1 wherein analyzing comprises identifying regions of the polarization optical image that are above a threshold value.

14. The method of claim 1 wherein analyzing comprises identifying regions of the polarization optical image that are above a local mean of a region of the polarization optical image.

15. The method of claim 1 wherein the positioning step includes at least one position correction to compensate for position errors between a first microscope objective used to create the polarization optical map and a second microscope objective use to focus the probe beam on the microplastic particle.

16. The method of claim 15 wherein the position correction is applied automatically without user intervention.

17. The method of claim 15 wherein the position correction is applied automatically after a manual calibration step performed by a user.

18. The method of claim 15 wherein the position correction comprises corrections for image non-uniformity caused by the first microscope objective.

19. The method of claim 1, wherein the probe beam is provided at a sub-milliwatt level and the illumination at the plurality of infrared wavelengths is provided at a sub-milliwatt level.

20. The method of claim 1, wherein collecting the probe light comprises passing the probe light through a pinhole prior to the probe light interacting with a detector.

21. The method of claim 20, wherein the pinhole is a confocal pinhole and the method further comprises performing a DC autofocus for rapid adjustment of objective focus on the plurality of microplastic particles.

22. An optical system for automatically characterizing a sample with a population of microplastic particles, the optical system comprising:

a crossed polarized microscopy subsystem arranged to acquire a polarization optical image of a sample and identify a plurality of microplastic particle positions of the sample; and a photothermal infrared spectroscopy system arranged to illuminate the plurality of microplastic particle positions with a plurality of infrared wavelengths to detect a corresponding optical photothermal infrared absorption of the microplastic particles at each of the plurality of microplastic particle positions.

23. The optical system of claim 22, further comprising an objective, wherein:

the crossed polarized microscopy subsystem comprises an illumination light source arranged to direct a beam of illumination light to the sample through the objective;

the photothermal infrared spectroscopy subsystem comprises an infrared light source arranged to direct a beam of infrared light having the plurality of infrared wavelengths to the sample through the objective; and the photothermal infrared spectroscopy subsystem comprises a probe light source arranged to direct a probe beam to the sample through the objective.

24. The optical system of claim 23, wherein the illumination light source is configured to operate at a sub-milliwatt power level and the infrared light source is configured to operate at a sub-milliwatt power level.

25. The optical system of claim 23, further comprising a confocal pinhole arranged along an optical path of the probe light between the objective and the detector.

26. The optical system of claim 23, further comprising a movable reflector configured to selectively direct the beam of illumination light to the objective, or to selectively admit the beam of infrared light and the probe beam to the objective.

27. The optical system of claim 22, wherein the optical system is configured to characterize at least 100 particles per hour.

28. The optical system of claim 22, wherein the optical system is configured to characterize the plurality of particles at a success rate in excess of 50%.

29. A method for automatically characterizing a sample with a population of microplastic particles with photothermal infrared spectroscopy, the method comprising:

a) acquiring at least one photothermal infrared images of the sample at a plurality of infrared wavelengths;

b) analyzing at least one optical image and/or photothermal infrared image to identify a plurality of particle positions;

c) analyzing the at least one photothermal infrared images of the sample to select a portion of the plurality of particle positions as likely microplastic particle positions, d) based upon the plurality of likely microplastic particle positions, automatically positioning a particle under a probe beam of a photothermal infrared spectroscopy system;

d) illuminating the particle with a plurality of infrared wavelengths; and e) detecting a change in probe light collected from the particle corresponding to infrared absorption of the particle.

30. The method of claim 29 further comprising determining a chemical identification of the population of microplastic particles in the sample.

* * * * *